United States Patent
Eby et al.

(10) Patent No.: US 7,284,549 B1
(45) Date of Patent: Oct. 23, 2007

(54) PORTABLE BARBEQUE GRILL

(75) Inventors: Darren L Eby, Bristol, IN (US);
Gregory G Macri, Elkhart, IN (US)

(73) Assignee: A.S.C. Industries, Inc., Elkhart, IN (US)

( * ) Notice: Subject to any disclaimer, the term of this patent is extended or adjusted under 35 U.S.C. 154(b) by 0 days.

(21) Appl. No.: 10/864,542

(22) Filed: Jun. 9, 2004

Related U.S. Application Data

(60) Provisional application No. 60/496,198, filed on Aug. 19, 2003.

(51) Int. Cl.
*F24C 15/30* (2006.01)

(52) U.S. Cl. .................. 126/9 R; 126/25 R; 126/40; 126/304 R

(58) Field of Classification Search ............... 126/9 R, 126/9 A, 25 R, 29, 30, 56, 273 A, 304 R, 126/304 A, 40, 50
See application file for complete search history.

(56) References Cited

U.S. PATENT DOCUMENTS

| | | | |
|---|---|---|---|
| 759,435 A | 5/1904 | Greeley | |
| 2,666,425 A | 1/1954 | Hastings, Jr. ................ | 126/25 |
| 2,667,392 A * | 1/1954 | Sexton ..................... | 126/25 R |
| 2,912,972 A | 11/1959 | Leyen .......................... | 126/25 |
| 2,922,414 A | 1/1960 | Brender ......................... | 126/9 |
| 3,032,783 A | 5/1962 | Swanson, Jr. .................... | 9/1 |
| 3,060,920 A | 10/1962 | Dibert ........................ | 126/276 |
| 3,266,478 A | 8/1966 | Booth ......................... | 126/25 |
| 3,285,239 A | 11/1966 | Drake ......................... | 126/25 |
| 3,306,280 A | 2/1967 | Vannoy ........................ | 126/25 |
| 3,452,736 A | 7/1969 | Harff et al. .................... | 126/25 |
| 3,503,324 A | 3/1970 | Gmeiner ....................... | 99/393 |
| 3,536,060 A | 10/1970 | Block et al. .................. | 126/307 |
| 3,605,718 A | 9/1971 | Winters ........................ | 126/25 |
| 3,692,351 A | 9/1972 | Christopher et al. ....... | 296/23 R |
| 3,753,431 A | 8/1973 | Koziol .......................... | 126/38 |
| 3,806,987 A | 4/1974 | Koziol .......................... | 16/191 |
| 3,843,082 A | 10/1974 | Garrett .................... | 248/226 E |
| 4,089,554 A | 5/1978 | Myers ....................... | 296/24 A |
| 4,143,902 A | 3/1979 | Johnstone ................... | 296/167 |

(Continued)

FOREIGN PATENT DOCUMENTS

GB 199584 6/1923

(Continued)

OTHER PUBLICATIONS

Trademark Electronic Search System printout for mark CAR-B-Q; Registration No. 2,775,590, registered Oct. 21, 2003.

(Continued)

*Primary Examiner*—Josiah C. Cocks
(74) *Attorney, Agent, or Firm*—Van Dyke, Gardner, Linn & Burkhart, LLP

(57) ABSTRACT

A portable grill that includes a grill body and support stand that may be removably mounted on a wall and alternatively supported on a horizontal surface such as the ground or a table using the same support stand. A cutting board is selectively interchangeable with the grill body on the support stand. Alternatively, a support element includes depressed side regions that accommodate side projections on a grill body so that the grill body may be lowered onto the support element.

16 Claims, 27 Drawing Sheets

U.S. PATENT DOCUMENTS

| | | | |
|---|---|---|---|
| 4,325,294 A | 4/1982 | Hammond | 99/337 |
| 4,347,830 A | 9/1982 | Runyan | 126/9 R |
| 4,518,189 A | 5/1985 | Belt | 296/22 |
| D282,619 S | 2/1986 | Fitzgerald et al. | D7/332 |
| 4,592,335 A | 6/1986 | Beller | 126/25 A |
| 4,599,988 A * | 7/1986 | Madurski | 126/9 R |
| 4,665,888 A * | 5/1987 | Christen et al. | 126/25 R |
| 4,729,535 A | 3/1988 | Frazier et al. | 248/230 |
| D302,641 S | 8/1989 | Elmburg | D7/332 |
| 4,893,609 A | 1/1990 | Giordani et al. | 126/350 R |
| 5,029,935 A | 7/1991 | Dufrancatel | 296/156 |
| 5,033,448 A | 7/1991 | Sandweg | 126/25 R |
| 5,165,384 A * | 11/1992 | Knutson | 126/25 C |
| 5,178,126 A | 1/1993 | Beller | 126/25 A |
| 5,188,089 A | 2/1993 | Hamilton | 126/30 |
| 5,263,467 A | 11/1993 | Jones | 126/42 |
| 5,310,147 A | 5/1994 | Billman | 248/214 |
| 5,394,590 A | 3/1995 | Yu | 16/357 |
| 5,411,011 A | 5/1995 | Teta | 126/50 |
| 5,472,164 A | 12/1995 | Contee, Jr. | 248/214 |
| 5,499,573 A | 3/1996 | Lin | 99/337 |
| 5,586,546 A | 12/1996 | Ashcraft et al. | 126/42 |
| 5,626,126 A * | 5/1997 | McNulty | 126/276 |
| 5,640,949 A | 6/1997 | Smith | 126/276 |
| 5,878,739 A | 3/1999 | Guidry | 126/25 R |
| 5,950,617 A | 9/1999 | Lorenz | 126/276 |
| D415,649 S | 10/1999 | Pai | D7/337 |
| 5,967,134 A | 10/1999 | Harris | 126/41 R |
| D415,925 S | 11/1999 | Pai | D7/337 |
| D420,244 S | 2/2000 | Pai | D7/332 |
| 6,035,800 A | 3/2000 | Clifford | 114/347 |
| 6,125,838 A | 10/2000 | Hedgpeth | 126/41 R |
| D436,284 S | 1/2001 | Mak | D7/332 |
| 6,263,867 B1 | 7/2001 | Skelton | 126/37 B |
| D446,678 S | 8/2001 | Pai | D7/337 |
| 6,354,286 B1 | 3/2002 | Davis | 126/276 |
| 6,357,344 B2 | 3/2002 | O'Grady et al. | 99/340 |
| D461,360 S | 8/2002 | Bossler | D7/337 |
| 6,637,426 B2 | 10/2003 | Champlin | 126/41 R |
| 2001/0042545 A1 | 11/2001 | Robin | 126/276 |
| 2002/0020405 A1* | 2/2002 | Coleman et al. | 126/41 R |
| 2002/0069867 A1* | 6/2002 | Champlin | 126/41 R |
| 2003/0024523 A1 | 2/2003 | Ching-Hui | 126/25 R |

FOREIGN PATENT DOCUMENTS

| | | |
|---|---|---|
| GB | 226979 | 1/1925 |
| JP | 8-189175 A * | 7/1996 |

OTHER PUBLICATIONS

Web page (vitco.com) printout of portable grill.
Web page (myrvq.com) printout of portable grill.
Kingsford portable grill.
Weber "Gas Go-Anywhere" portable grill.
Weber "Charcoal Go-Anywhere" portable grill.
Picture of a portable grill.
Web page (supergrills.com) printout of deluxe portable gas grill.
Web page (supergrills.com) printout of deluxe portable grills.
Web page (supergrills.com) printout of "Artic Treasure Chest Portable Gas Grill".
Web page (cajun-outdoor-cooking.com) printout of "Artic Square Suitcase Deluxe Portable Charcoal Grill".
Web page (cajun-outdoor-cooking.com) printout of "Artic Portable Table Top Porcelain Gas Grill".
Web page (apatiooulet.com) printout of "Deluxe Portable BBQ Grill".
Picture of a Thermos brand portable grill.
Web page (apatiooutlet.com) printout of "Porta-Chef LP Grill".
Web page (outdoor-recreation.aubuchonhardware.com) printout of "Portable Gas Table Top Grill".
Web page (bbqpeople.com) printout of portable "Charcoal Grill" and portable "Propane Grill".
Web page (flamingbarbecues.co.uk) printout of "Outback Gas Weekender".
Web page (flamingbarbecues.co.uk) printout of "Lifestyle Table Top Barbeque".
Web page (grill4all.com) printout of "Grill-4-All System".
Web page (grill4all.com) printout of "Stainless Steel Portable Propane Grill".
Web page (rvlifestyles.net) printout of "BBQ Grill/Smk. Plate".
Frontgate Catalogue (2003), "Portable Stainless Steel Grill".
Lillian Vernon Favorites Catalogue, "George Foreman Portable Gas Grill".
Web page (lillianvernon.com) printout of "George Foreman Portable Gas Grill".
Bart's Watersports Catalog, "Sports Extreme BBQ/Stove Oven" and "Sport Supreme Grill/Oven".
Web page (bartswatersports.com) printout of "Sport Supreme Propane Barbeque Grill/Oven".
Web page (sportbbq.com) printout of "Party Size Sport Supreme Deluxe Propane BBQ Grill and Oven".
Web page (sportbbq.com) printout of accessories for Sport Barbeques.
Web page (rvpartstore.com) printout of "Portable Gas Barbeque Grill".
Photos of RVQ Portable Gas Grill.
Photos of Thermos Portable Gas Grill.
Photos of Grand Gourmet Portable Gas Grill.
Photos of Uniflame Portable Gas Grill.
Photos of BBQ Pro Portable Gas Grill.
Photos of Weber Portable Gas Grill.
Photos of Olympian 4100 Portable Gas Grill.
Photos of Freedom Deluxe Gas BBQ Grill.
Photos of Grill4All Portable Gas Grill.
Printouts of Thumbnails of Portable Gas Grills.
Web pages and pictures of "Grill 4 All" grill disclosing grill device available more than one year prior to Aug. 19, 2003.
"Magma Barbecues and Marine Accessories" catalog disclosing grill device available for more than one year prior to Aug. 19, 2003.
"Hitchhiker" Grill brochure that discloses a grill device which was available prior to Jun. 9, 2003.
"Side Kick" brochure, manual, and photos disclosing grill device available prior to Jun. 9, 2004.

* cited by examiner

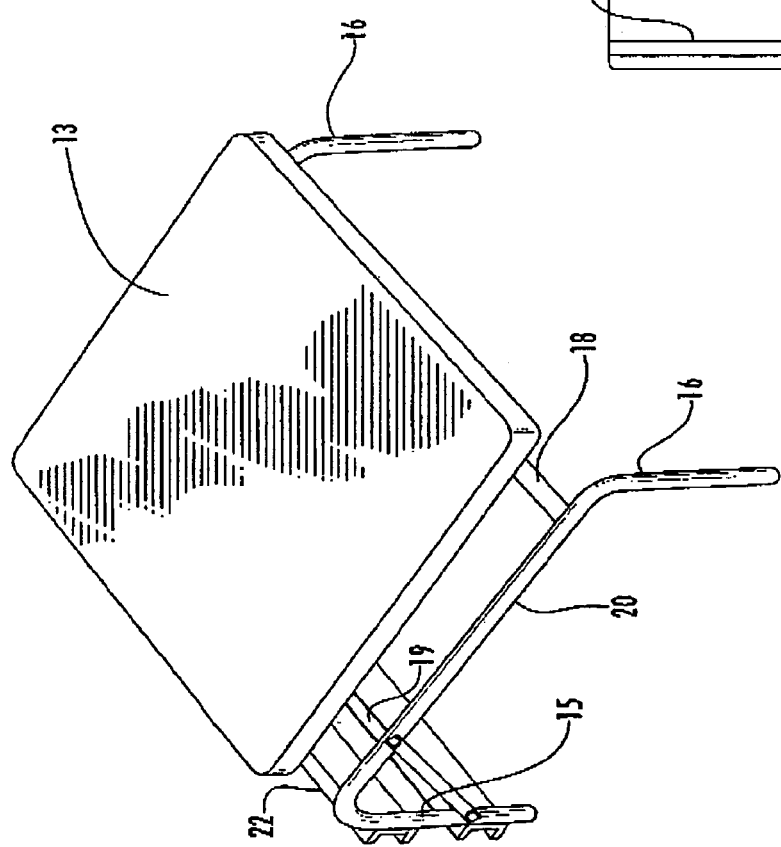
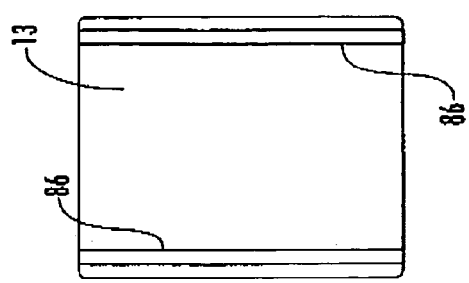

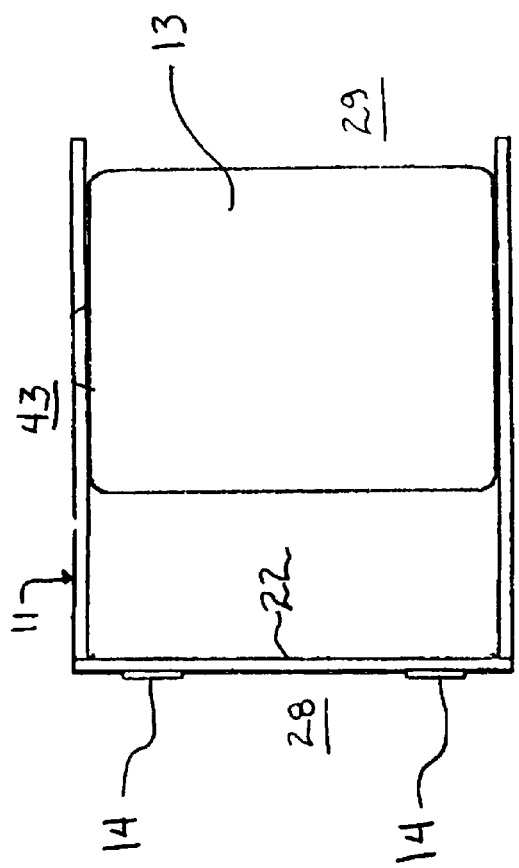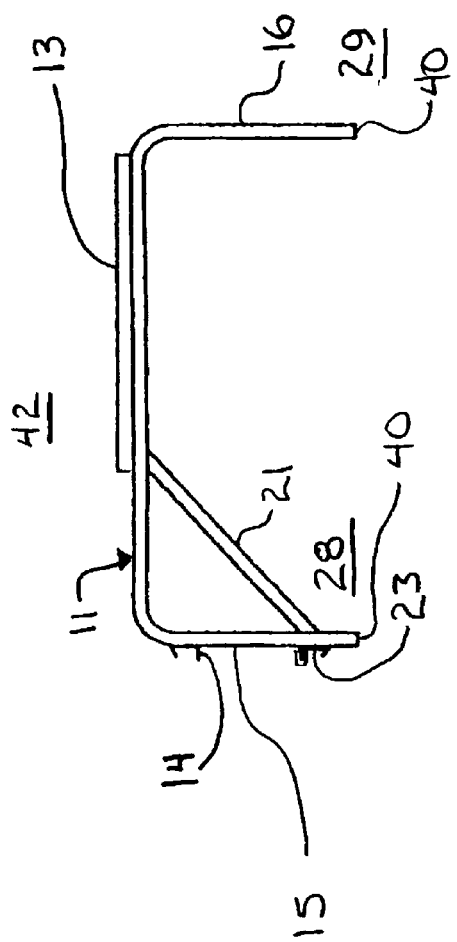

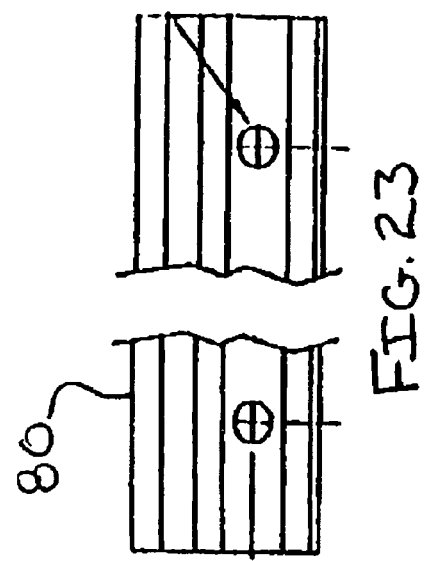
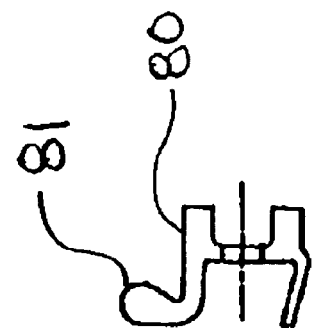
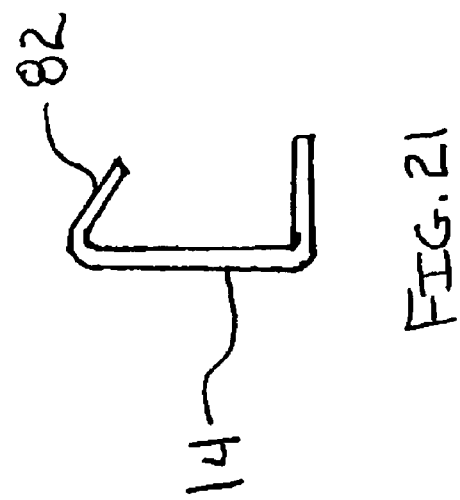

PORTABLE BARBEQUE GRILL

The present application claims benefit of U.S. provisional application Ser. No. 60/496,198, filed Aug. 19, 2003, which is herein incorporated by reference in its entirety.

FIELD OF THE INVENTION

The present invention is directed to portable cooking equipment and, in particular, portable grilling devices and portable cutting surfaces.

BACKGROUND OF THE INVENTION

The grilling of food is a popular method of food preparation, particularly in a recreational setting. Outdoor grilling is particularly popular in the summer time as a way to avoid introducing additional heat into an interior of a living environment as well as itself being a recreational activity. Further, outdoor grilling is often done at parks and campgrounds, as it is a convenient means of food preparation at locations that are away from normal residential areas. Portable grills are often used in such remote locations, as they are readily transportable as opposed to large, residential outdoor style grills. The demand for portable grilling methods is evidenced by the great many portable grills that exist in the marketplace. Examples of portable grills can be seen in U.S. Pat. No. 3,753,431 issued to Koziol, U.S. Design Pat. No. D282,619 issued to Fitzgerald, U.S. Design Pat. No. D461,360 issued to Bossler and in the Webber® GO-Anywhere® line of grills.

While portable grills are popular and convenient, they have some significant limitations in terms of their usefulness. Portable grills often include only low profile stands, and are used on the ground or on an elevated surface such as a picnic table. Grilling on the ground is inconvenient for the grill operator, as the operator must continually bend over in order to prepare the food. Likewise, elevated surfaces may not always be available in some locations where portable grills are used, thus making any pre-grilling food preparation, such as filleting fish or cutting vegetables, difficult to perform. Further, if a picnic table is used to elevate the portable grill, some of the limited seating capacity or food preparation area is then consumed by the presence of the grill. Nonetheless, the usefulness of having the grill located at the remote cooking site represents a significant benefit.

Another popular category of grills are those mounted on a vehicle. In this style of grill, the grill is mounted on a car, van, boat, trailer, or other recreational vehicle. These vehicle mounted grills are variously mounted on trailer hitches, railings, ladders, walls, shelves, and racks on the vehicles. Although vehicle mounted grills provide significant benefits in that they are transportable to a vehicle-accessible location, these grills are not readily used in a grilling mode at a remote location away from the vehicle since the vehicle operates as a stand for the cooking body. Such a configuration can be seen in U.S. Pat. No. 6,637,426. However, in grills such as these, the grill is not actually a portable grill since the rack only supports the grill in an elevated position and is not able to independently support the grill on a horizontal surface detached from a vertical structure. As such, it is not possible to sue the grill associated with the U.S. Pat. No. 6,637,426 away from a vehicle, which severely limits rang of the usefulness of the grill.

Another type of grill that has been proposed are grills that may be mounted on a vehicle and also may be mounted on an independent stand. Examples of this type of grill are shown in U.S. Pat. Nos. 5,626,126 issued to McNulty; 6,640,949 issued to Smith; and Patent Application Publication 2001/0042545 A1 published to Robin. These types of grill may be used both with a vehicle and remote from a vehicle, but in these types of grills separate stand and mounting elements are required to be removed from or attached to the grill. In these types of grills one set of support members are connected to the grill in order to mount the grill on a vehicle and another set of support members are used to create an independent stand for the grill. Thus the complexity and number of parts are thus multiplied and require greater space for storage and transport.

SUMMARY OF THE INVENTION

In one preferred aspect of the invention a support stand that is adapted to hold a portable grill or a cutting board is mountable to a generally vertical wall by way of mounting elements affixed to the support stand. Preferably the support stand mounting elements removable mate with a mounting bracket affixed to the generally vertical wall. Alternatively, and independently, the support stand will hold the portable grill or cutting board on a generally horizontal surface by way of support elements that rest on the horizontal surface.

In a preferred embodiment a grill may be used alternatively between a wall mounted condition in which the support stand is mounted on a generally vertical wall and a table or ground support condition in which the grill is rested on the ground or a table. In an alternative preferred embodiment the grill is interchangeable with a cutting board on the support stand.

In yet another preferred embodiment the grill body includes at least one generally laterally protruding side element or handle extending from the side of the grill body and the receptacle area of the support stand includes at least one offset region adapted to receive the at least one side element. This embodiment enables the grill body to be placed on the support stand without having to tilt the grill body to avoid hitting support members of the receptacle with the grill body side elements. In a preferred embodiment the laterally protruding side element may alternatively include a seat for a beverage container, condiments, or implements.

The ability of the support stand to contain the portable grill or cutting board while mounted to a vertical wall enables an operator to cook or prepare food at a comfortable, elevated position as opposed to placing the portable cooking equipment on the ground, and without utilizing surface area of an elevated horizontal plane. The ability of the support stand to contain the portable grill while positioned on a horizontal surface increases the usefulness of the portable grill as it may be used when a suitable generally vertical wall is not available. Further, the ability of the support stand to hold a cutting board provides a convenient additional food preparation surface. Since the same support stand is used for wall mounting and resting on a horizontal surface, the complexity and number of parts is reduced, thus reducing the room necessary for storage and transport of grill components. The ability of the support stand to contain the portable grill while positioned on a horizontal surface also improves the stowage characteristics of the portable grill as it need not remain affixed to a generally vertical wall.

BRIEF DESCRIPTION OF THE DRAWINGS

FIG. 17 is a perspective view of an alternative preferred embodiment of the support stand and cutting board assembly;

FIG. 18 is a bottom plan view of the cutting board of FIG. 17;

FIG. 19 is a top plan view of the support stand and cutting board assembly of FIG. 17;

FIG. 20 is a side elevational view of the support stand and cutting board assembly of FIG. 17.

FIG. 21 is a side elevational view of a preferred grill stand mounting element;

FIG. 22 is a side elevational view of a preferred wall mounted bracket element used with the grill stand mounting element of FIG. 22;

FIG. 23 is a rear elevational view of the wall mounted bracket element of FIG. 22;

DESCRIPTION OF THE PREFERRED EMBODIMENTS

Figure 1:
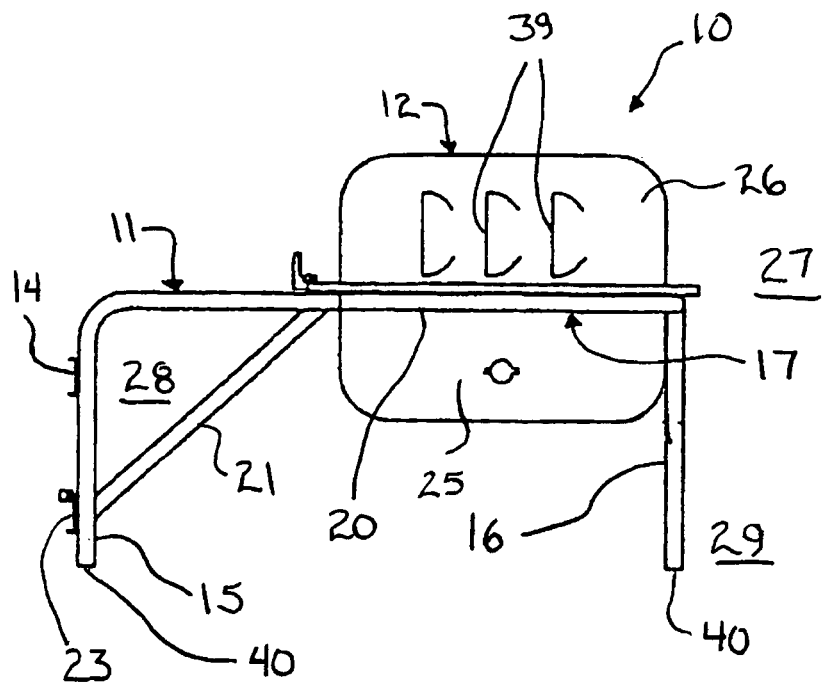
FIG. 1 is a side elevational view of a preferred embodiment of the portable grill and support stand assembly.

The present invention is embodied in a portable cooking equipment unit, a preferred embodiment of which is a portable barbeque grill unit shown in FIG. 1 and identified by reference numeral 10. Portable barbeque grill unit 10 includes a support stand 11 that is used to hold a cooking or grill body 12. Support stand 11 may be mounted on a vertical wall surface, as in FIG. 24, such as a fixed wall or wall of a vehicle. Support stand 11 also may independently support grill body 12 on a horizontal surface, as in FIG. 25, such as the ground or table. Portable barbeque grill unit 10 is therefore readily interchangeable between a wall mounted grill and a table or ground supported grill without requiring multiple independent stands or supports. The portable cooking equipment unit may alternatively, as shown in the preferred embodiments of FIG. 20, support a cutting surface element by removably replacing grill body 12 with cutting board 13 such that cutting board 13 is held by support stand 11.

Figure 2:
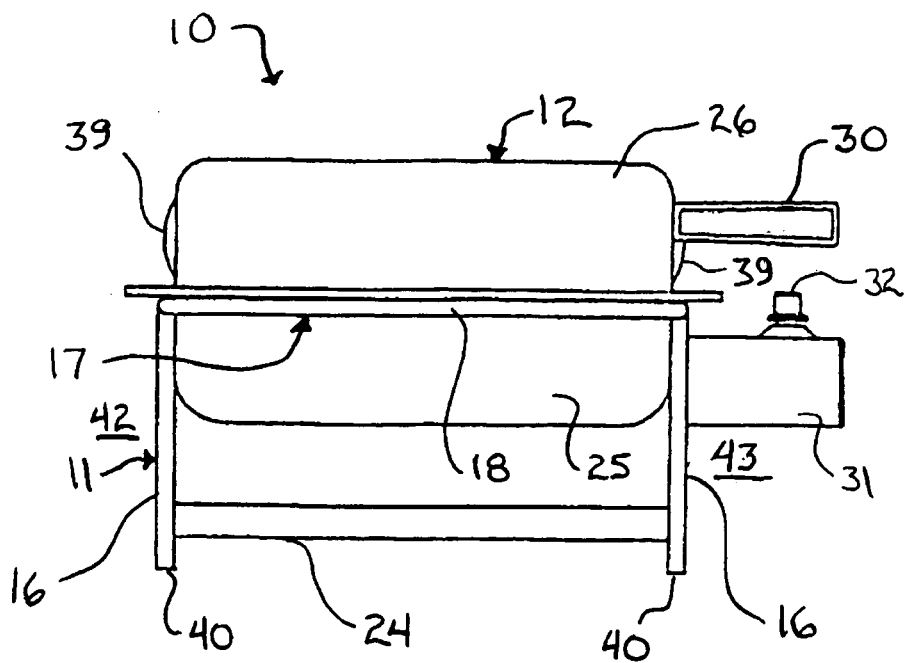
FIG. 2 is a front elevational view of the portable grill and support stand assembly of the embodiment of FIG. 1.

Referring to FIGS. 1 and 2, one preferred embodiment of the portable barbeque grill unit 10 can be seen to comprise support stand 11 that includes wall mounts or wall connectors that are disclosed as mounting elements 14. Support stand 11 also includes ground supports that are disclosed as a pair of rear elements or legs 15 and a pair of forward support elements or legs 16, where rear support elements 15 are located on a rearward region 28 of support stand 11 and forward support elements 16 are located on a forward region 29. With additional reference to FIGS. 5 and 6, it can be understood that forward and rear support elements 16, 15 are located on spaced lateral sides 42, 43 of support stand 11.

Figure 5:
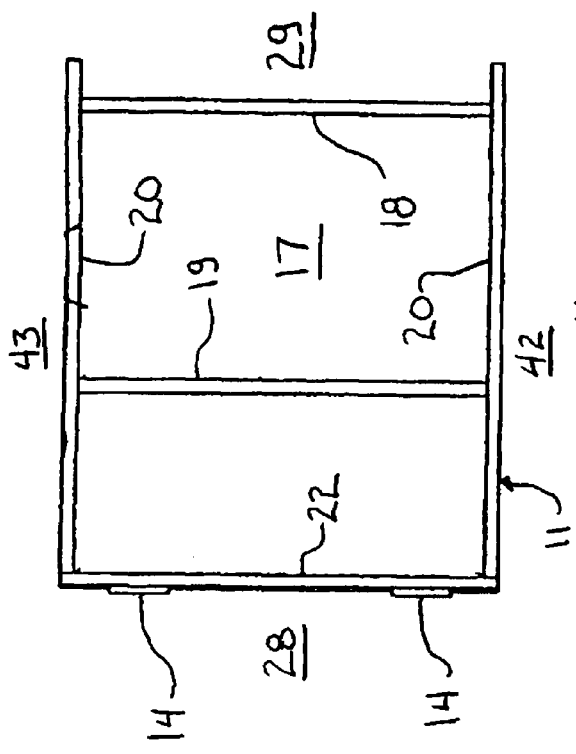
FIG. 5 is a top plan view of the support stand of the embodiment of FIG. 1.
Figure 6:
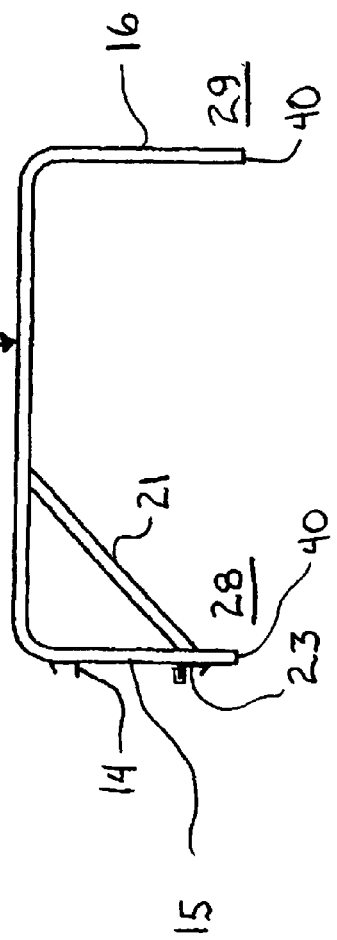
FIG. 6 is a side elevational view of the support stand of the embodiment of FIG. 5.

As shown in FIGS. 5 and 6, support stand 11 includes receptacle 17 for receiving removable components, receptacle 17 being defined by a forward horizontal cross member 18, a rear horizontal cross member 19, and a pair of side support members 20. A reinforcing cross member 21 extends between each rear support element 15 and a corresponding side support member 20 in order to provide structural integrity when support stand 11 is holding grill body 12 that is fully loaded with pre-cooked food. Mounting elements 14 are affixed to upper brace bar 22 and a pair of lower braces 23 are affixed to lower brace bar 24 at the rear of support stand 11. The upper brace bar 22 spans between rear support elements 15. In this embodiment, two laterally spaced mounting elements 14 and two laterally spaced lower braces 23, spaced beneath, are disclosed. Alternatively, however, a single mounting element 14 and a single lower brace 23 could be used that extend over a substantial portion of the width of support stand 11 and may span between support elements 15, without altering the function of support stand 11. Rear and forward support elements 15, 16 have lower ends 40 that lie in generally the same plane when receptacle 17 is horizontally oriented. Although not shown, lower ends 40 may be provided with a set of foot caps or plugs made of rubber, polymeric, or other suitable material to provide a stable, scratch preventative base for grill unit 10 when placed on a generally horizontal surface.

As noted, forward support elements 16 and rear support elements 15 operate as legs and can be used to support grill unit 10 on a generally horizontal surface, such as a picnic table or the ground. Alternatively, mounting elements 14 can be used to selectively and removably mount grill unit 10 to a generally vertical wall, such as the side of a recreational vehicle. When mounting elements 14 are used to mount support stand 11 to a generally vertical wall, lower braces 23 are forced by a gravity generated torque moment against the generally vertical wall and, along with lower brace bar 24, hold grill unit 10 steady. The lower braces 23 may be coated with rubber or made of a suitable non-metallic material to prevent scratching or damaging of the generally vertical wall. Support stand 11 is preferably made of tubular aluminum rods or other suitable material that are bent and joined by conventional means and provide a relatively light weight but rigid structure sufficient to provide cantilevered support to grill body 12 and cutting board 13.

Figure 3:
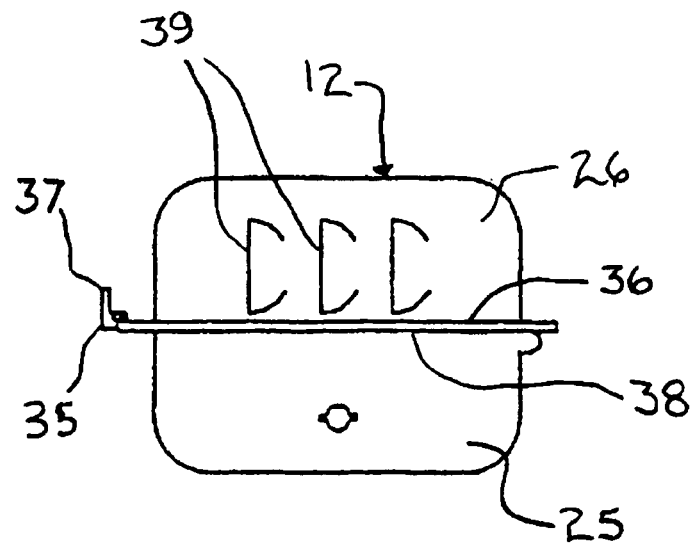
FIG. 3 is a side elevational view of the portable grill of the embodiment of FIG. 1.
Figure 4:
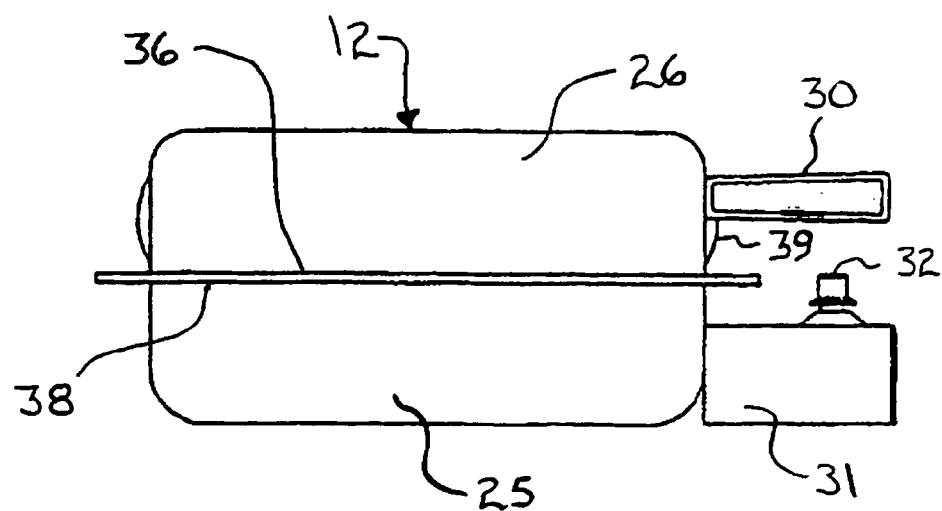
FIG. 4 is a front elevational view of the portable grill of FIG. 3.

FIGS. 3 and 4 disclose that grill body 12 preferably has a lower section 25 and an upper section or lid 26 that sits on lower section 25 in clamshell fashion. In the preferred embodiment grill body 12 is roughly rectangular with rounded corners and edges, but may alternatively be square, circular, oval, or other configuration with support stand 11 being correspondingly configured to accommodate grill body 12. Grill lid 26 also includes a handle 30 for raising and lower the grill lid 26 to access the cooking area of grill body 12. Although handle 30 is preferably a post extending to one side of lid 26, other shapes and locations of handle 30 may be used, such as a post extending to each side of lid 26 or a conventional U-shaped handle that protrudes from the front face or top wall of lid 26.

Figure 27:
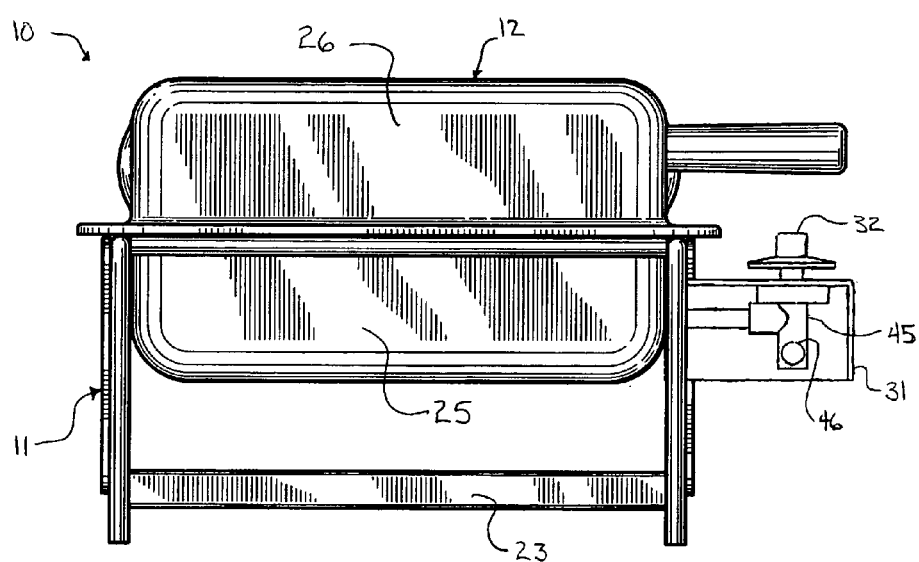
FIG. 27 is a front elevational view of the portable barbeque grill unit of FIG. 26.
Figure 28:
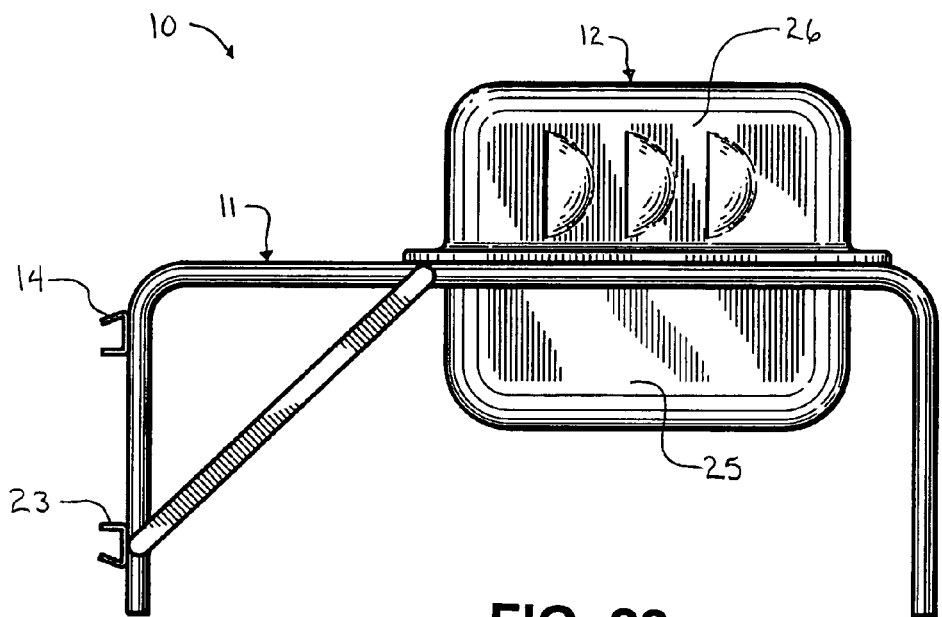
FIG. 28 is a left side elevational view of the portable barbeque grill unit of FIG. 26.
Figure 29:
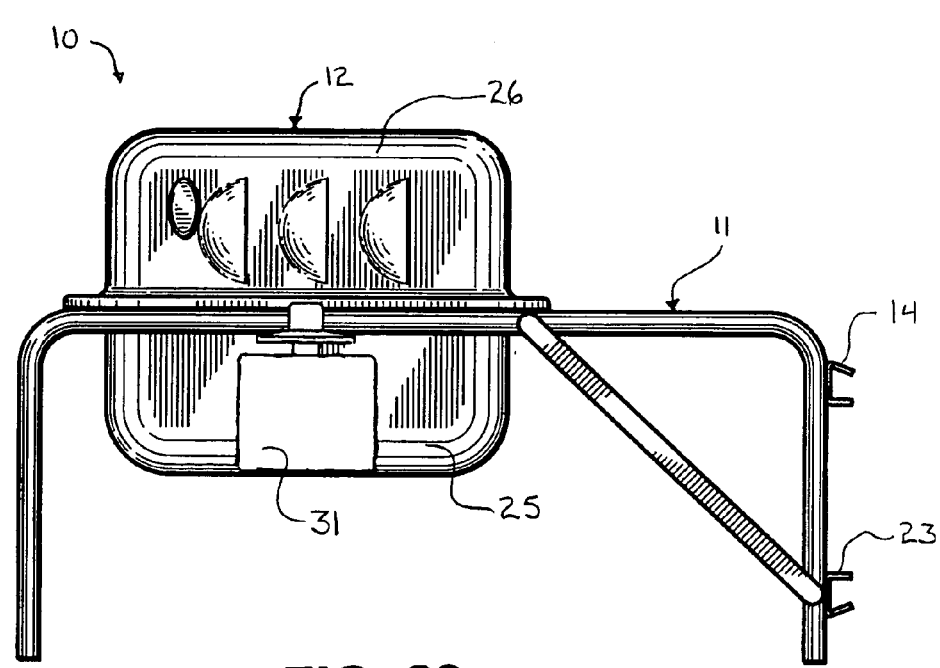
FIG. 29 is a right side elevational view of the portable barbeque grill unit of FIG. 26.
Figure 30:
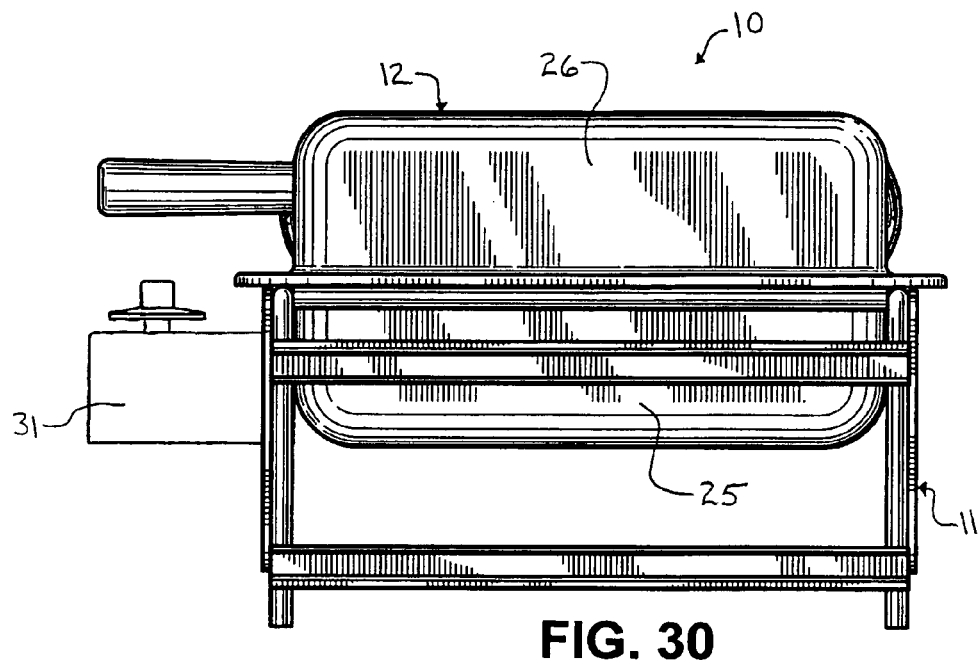
FIG. 30 is a rear elevational view of the portable barbeque grill unit of FIG. 26.
Figure 31:
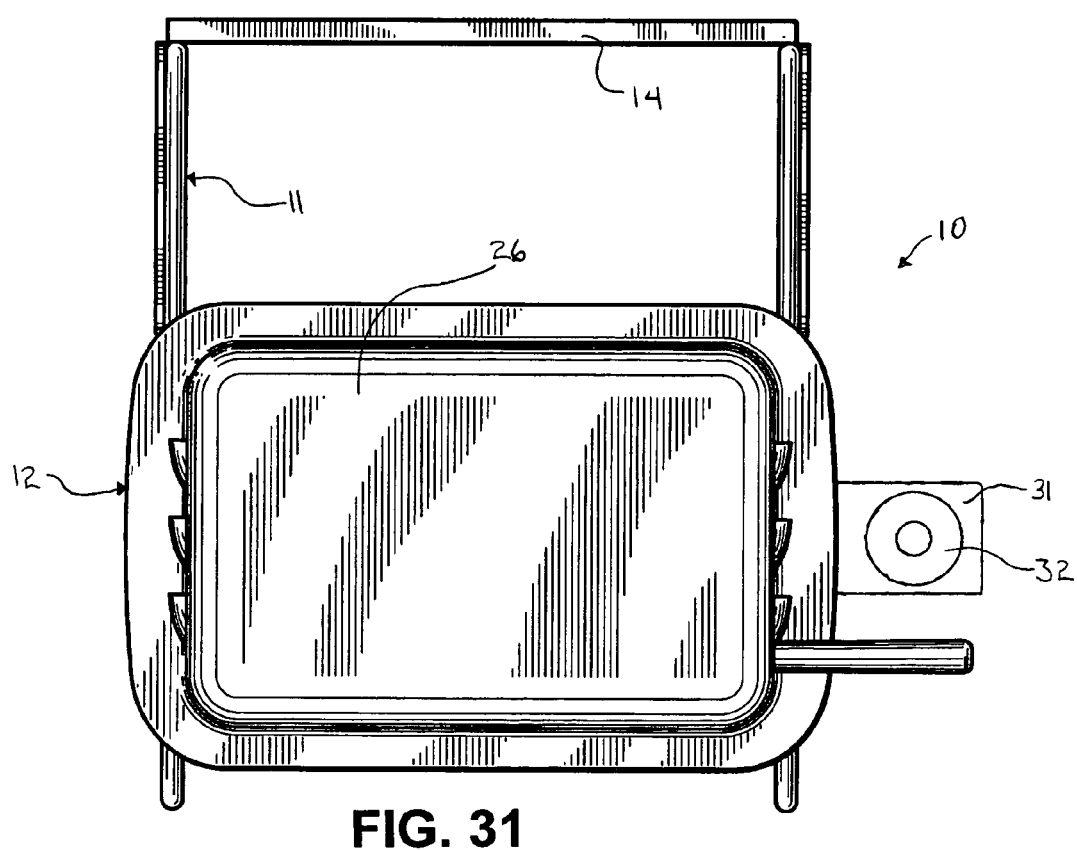
FIG. 31 is a top plan view of the portable barbeque grill unit of FIG. 26.
Figure 32:
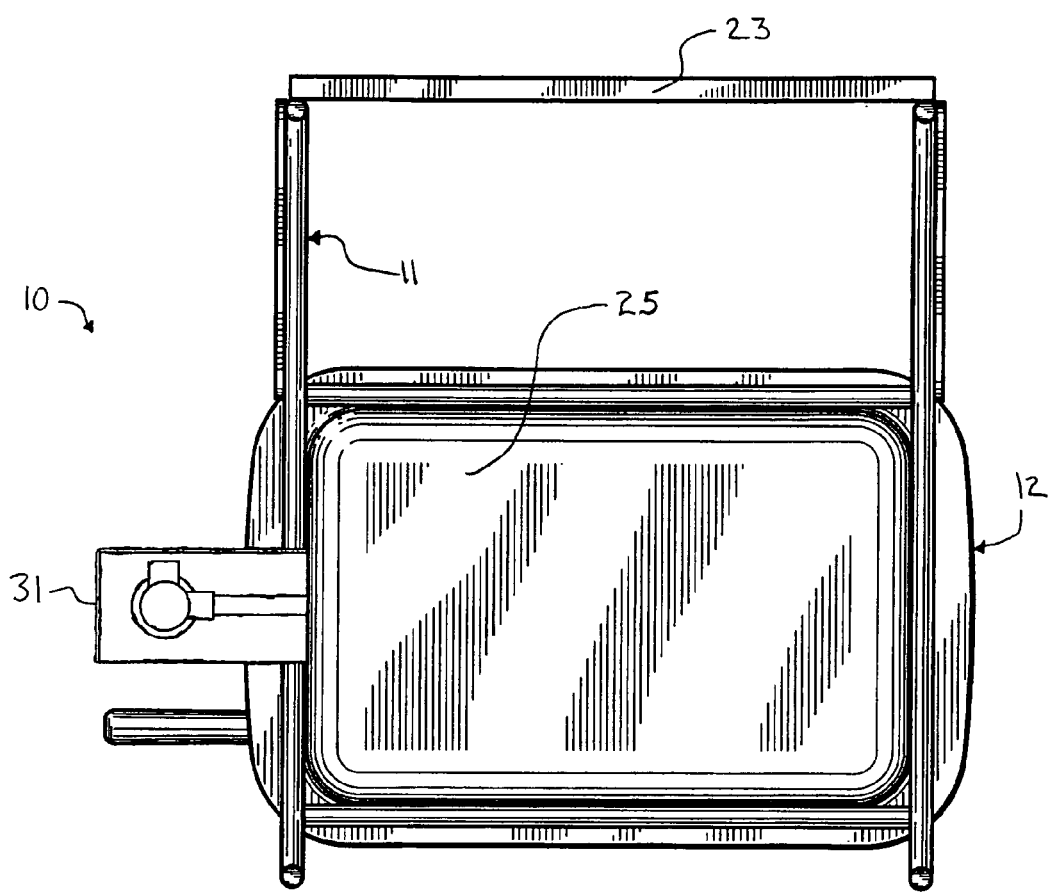
FIG. 32 is a bottom plan view of the portable barbeque grill unit of FIG. 26.
Figure 33:
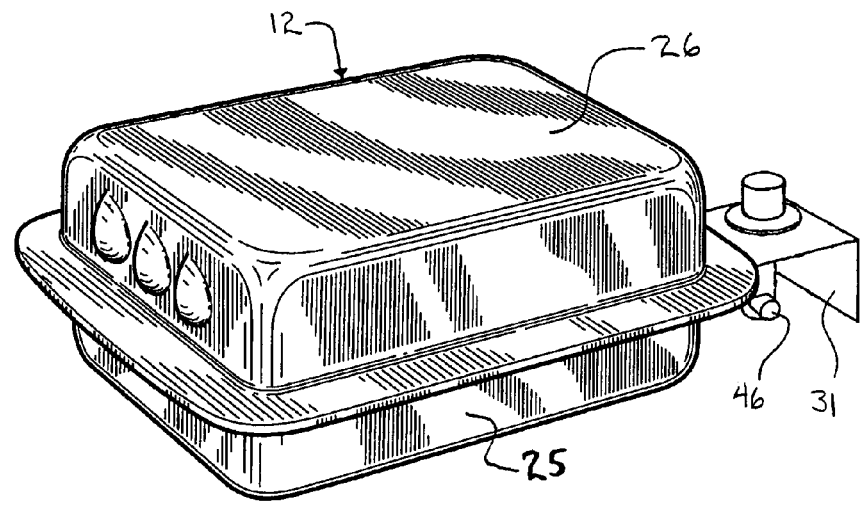
FIG. 33 is a perspective view of the portable grill of FIG. 26 shown without the support stand.
Figure 34:
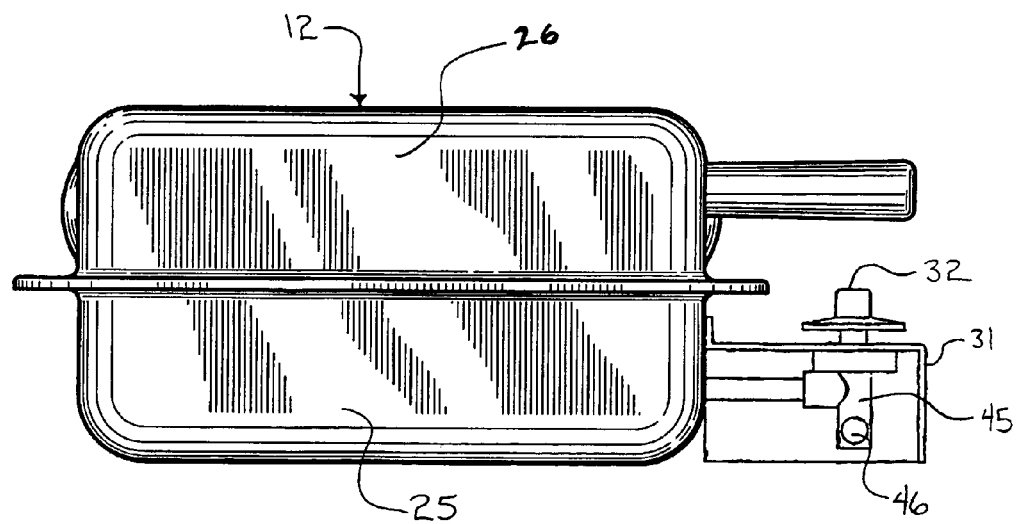
FIG. 34 is a front elevational view of the portable grill of FIG. 33.
Figure 35:
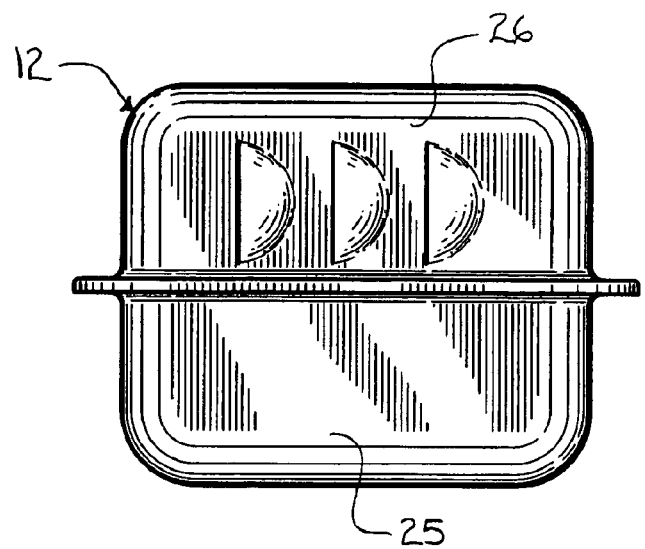
FIG. 35 is a left side elevational view of the portable grill of FIG. 33.
Figure 36:
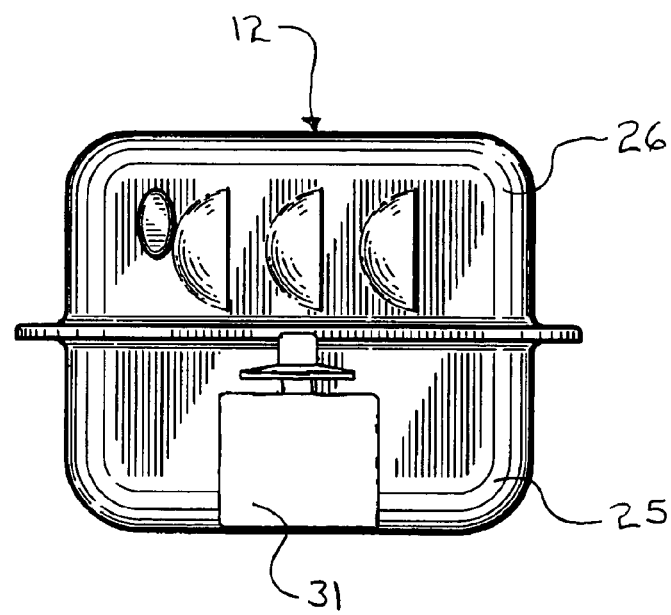
FIG. 36 is a right side elevational view of the portable grill of FIG. 33.
Figure 37:
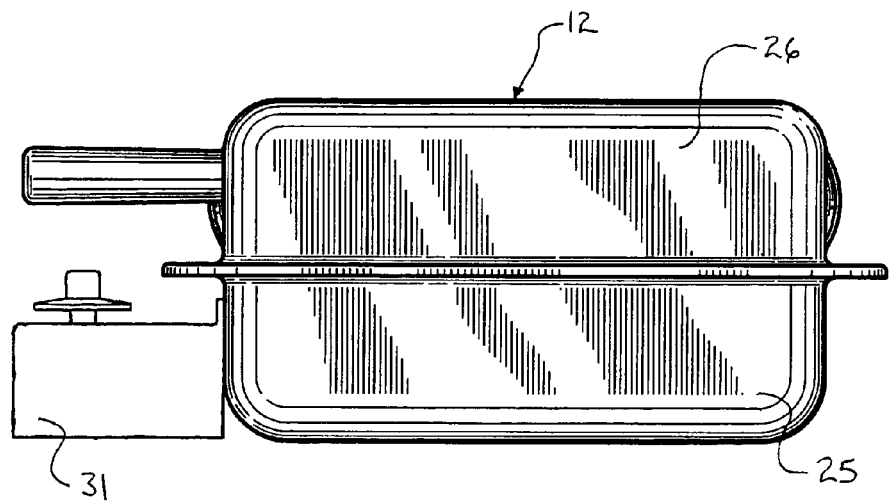
FIG. 37 is a rear elevational view of the portable grill of FIG. 33.
Figure 38:
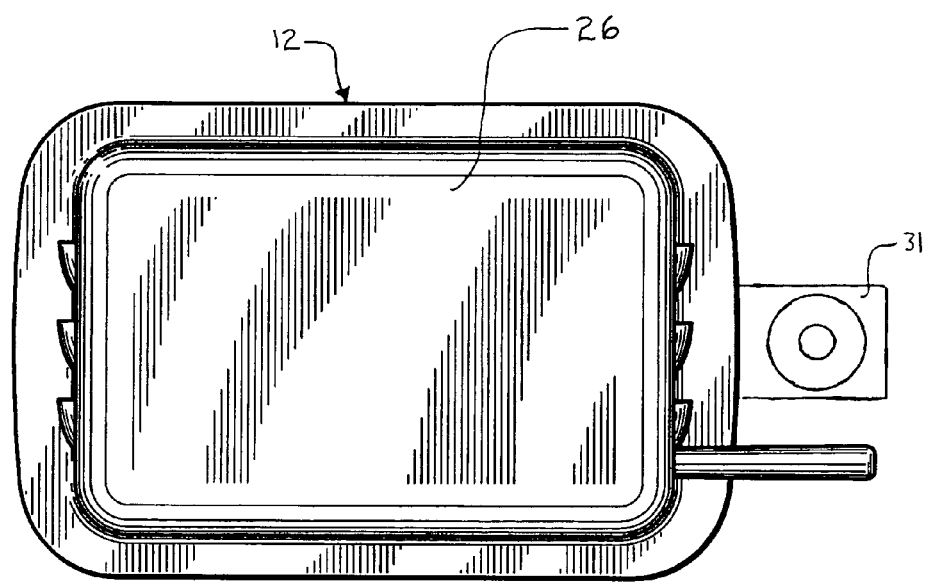
FIG. 38 is a top plan view of the portable grill of FIG. 33.
Figure 39:
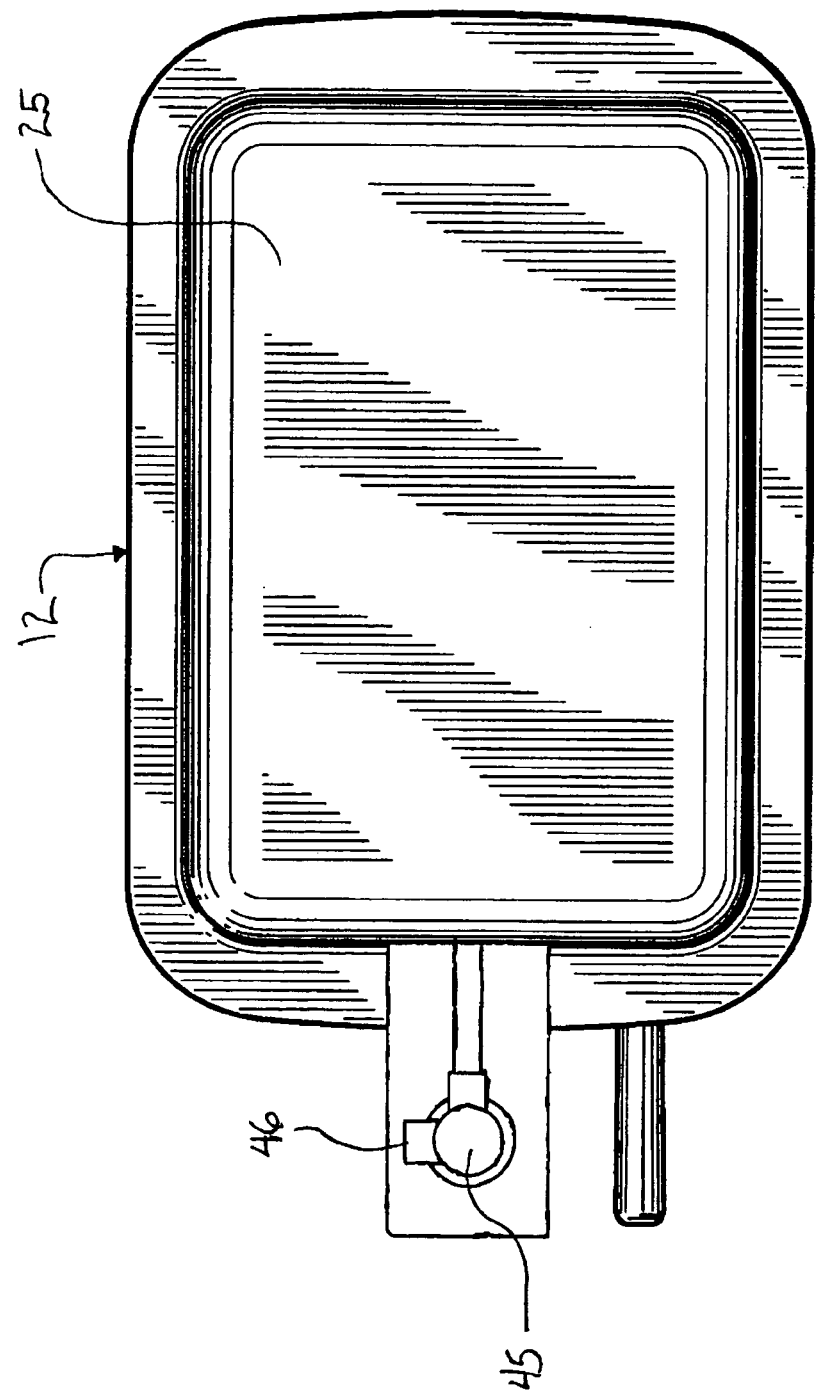
FIG. 39 is a bottom plan view of the portable grill of FIG. 33.

Grill body 12 also includes bracket 31 that supports regulator control valve knob 32 used to control a standard regulator valve 45 (FIG. 27). Regulator valve control knob 32 controls the amount of fuel, such as gasified liquid propane, supplied to grill body 12 through fuel supply connector 46. Cooking fuel may be supplied to the standard regulator valve 45 either by a flexible hose 33, as in FIG. 14, or by a canister of cooking fuel 34 held by support holder 41, as in FIG. 16. Support holder 41 may be mounted to either grill body 12 or the support stand. Flexible hose 33 may be coupled to a conventional fuel supply, such as the fuel supply bottles that are mounted on the exterior of a trailer tongue, recreational vehicle exterior wall or separately transportable fuel supply bottle. Flexible hose 33 may alternatively be connected to an exterior fuel supply bottle directly or alternatively through additional extension lines through a vehicle wall to the exterior fuel supply.

Grill body 12 further includes a hinge 35 that pivotably connects grill lid 26 to lower section 25. Hinge 35 also includes a lid stop 37 that allows grill lid 26 to remain in an open position without being held by the operator and without falling back away from the operator. Grill body 12 may alternatively not include a hinged connection of lid 26 about lower section 25, in which case lid 26 is lifted to open the grill. In this alternative, a handle on the lid top wall is preferred. Lower section 25 includes a peripheral flange or base lip 38 that supports the grill body 12 when it is placed in receptacle 17 of support rack 11. Grill lid 26 may also include a peripheral lip 36 that seats on base lip 38. Grill body 12 includes a series of vents 39 on each side of grill lid 26 that face rearwardly and away from an operator standing in front of grill 10 in order to direct cooking fumes and heat away from the user. Preferably handle 30 is located forward of vents 39 so that vents 39 direct heat rearwardly away from handle 30. Grill body 12 includes an internal cooking grid or grill surface and internal fuel spreaders or diffusers of conventional design (not shown) which are used as the internal cooking elements of the grill. Alternatively, a first starting mechanism may be included as well.

Figure 7:
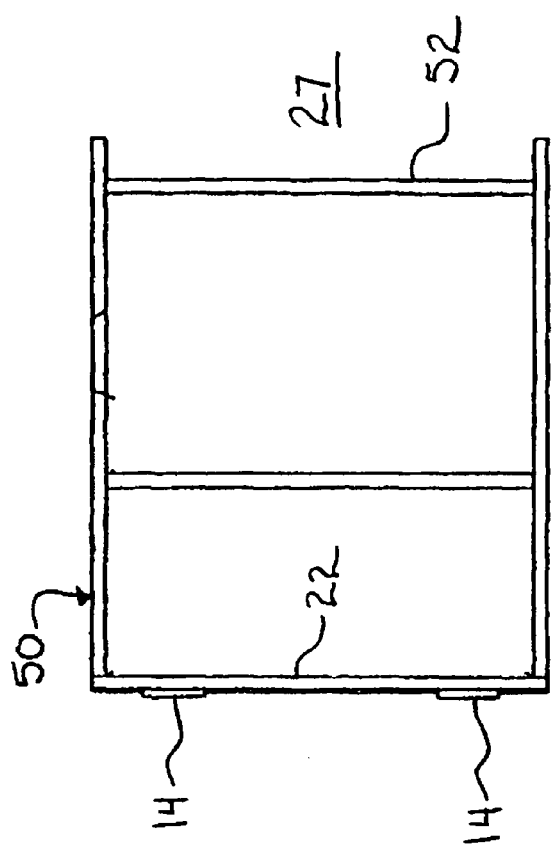
FIG. 7 is a top plan view of an alternative preferred embodiment of the support stand for use in the assembly in FIG. 1.
Figure 8:
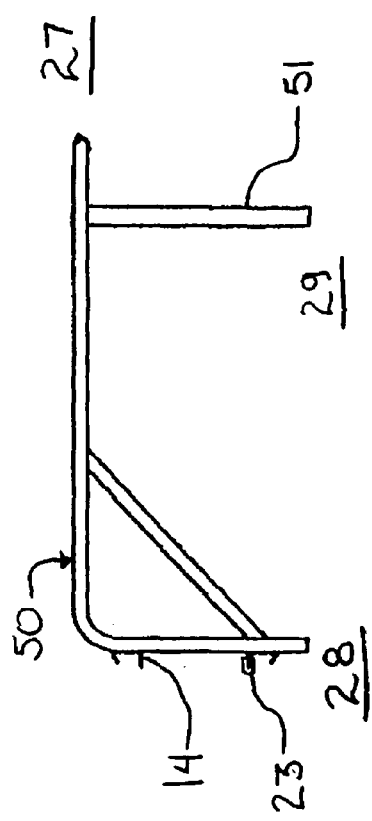
FIG. 8 is a side elevational view of the support stand of the embodiment of FIG. 7.

An alternative embodiment of a support stand 50 is shown in FIGS. 7 and 8. In this embodiment, a set of offset forward support elements or legs 51 of support stand 50 are positioned rearward from a forward horizontal cross member 52, but are still forward of the center of gravity of a grill body 12 as in FIG. 1. This provides increased clearance at the operator interface front portion 27 such that there is a decrease in the likelihood of a passerby inadvertently bumping or catching the offset forward legs 51. However, as the offset forward support element 51 is still forward of the center of gravity of grill body 12, including the center of gravity of grill body 12 when laden with food items, the support stand 50 is still able to independently support a grill body 12 on a generally horizontal surface.

Figure 9:
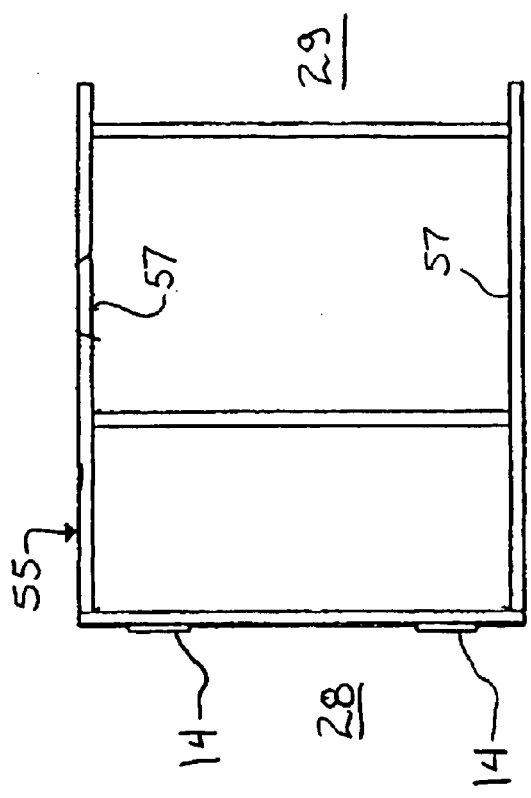
FIG. 9 is a top plan view of another preferred alternative embodiment of the support stand for use in the assembly of FIG. 1.
Figure 10:
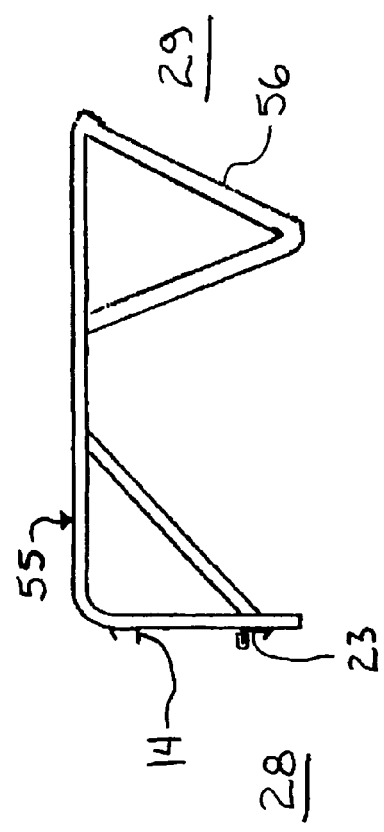
FIG. 10 is a side elevational view of the support stand of the embodiment of FIG. 9.

Another alternative embodiment is shown in FIGS. 9 and 10. Here, support stand 55 includes a set of V-shaped forward support members 56 integrated to a set of side support members 57.

Figure 12:
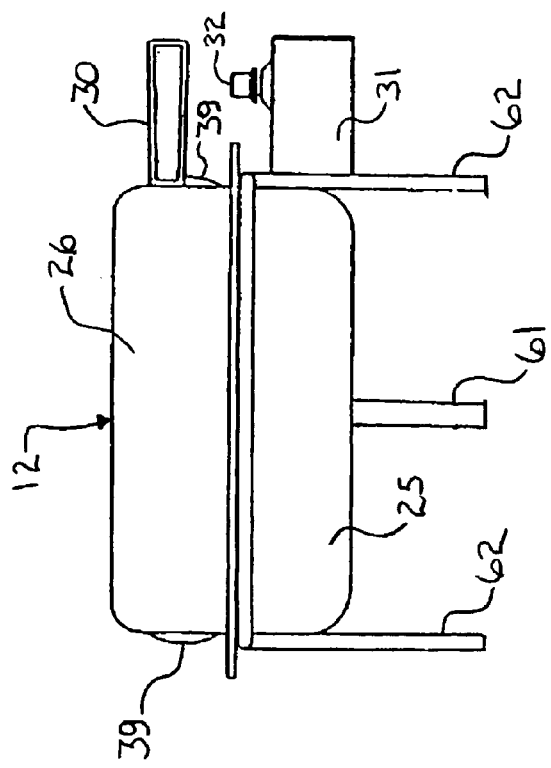
FIG. 12 is a front elevational view of the portable grill and support stand assembly of the embodiment of FIG. 11.
Figure 11:
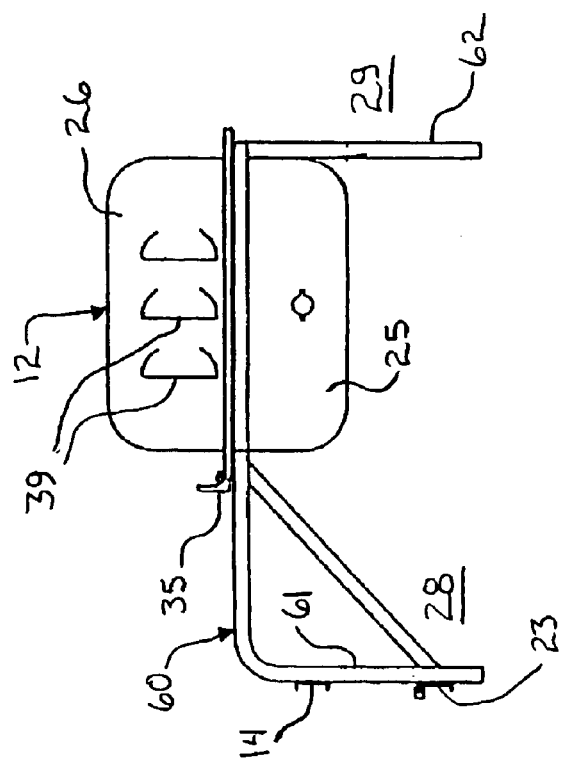
FIG. 11 is a side elevational view of another alternative preferred embodiment of the portable grill and support stand assembly.

The alternative embodiment of FIGS. 11 and 12 disclose a support stand 60 with a single rear support element 61 extending downward from an upper brace bar 22, where upper brace bar 22 can be seen in FIG. 5. When support stand 60 is placed on a generally horizontal surface, forward support elements 62 and rear support element 61 form a tripod configuration.

Figure 13:
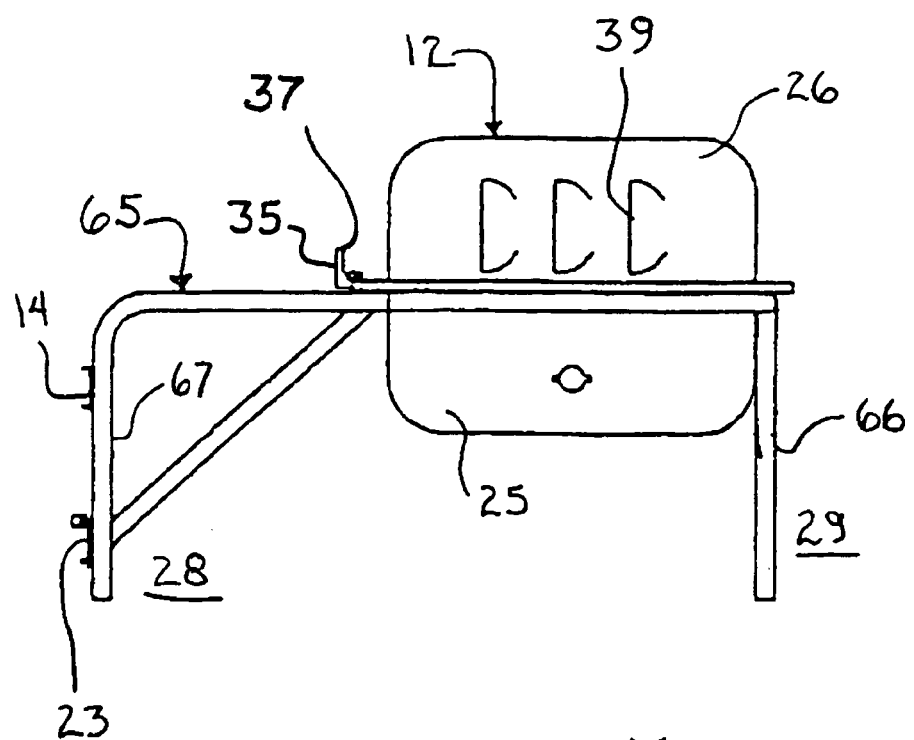
FIG. 13 is a side elevational view of another alternative preferred embodiment of the portable grill and support stand assembly.
Figure 14:
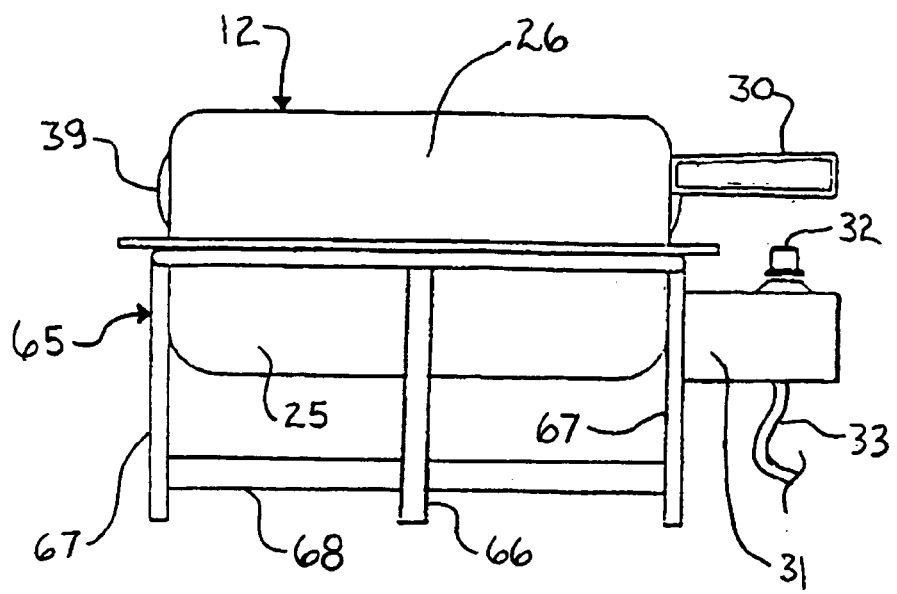
FIG. 14 is a front elevational view of the portable grill and support stand assembly of FIG. 13.

The alternative embodiment of FIGS. 13 and 14 disclose a support track 65 with a single forward support element 66 and two rear support elements 67 attached to lower brace bar 68. Here again, when support stand 65 is placed on a generally horizontal surface, forward support element 66 and rear support elements 67 support the grill body 12 in a tripod configuration.

Figure 15:
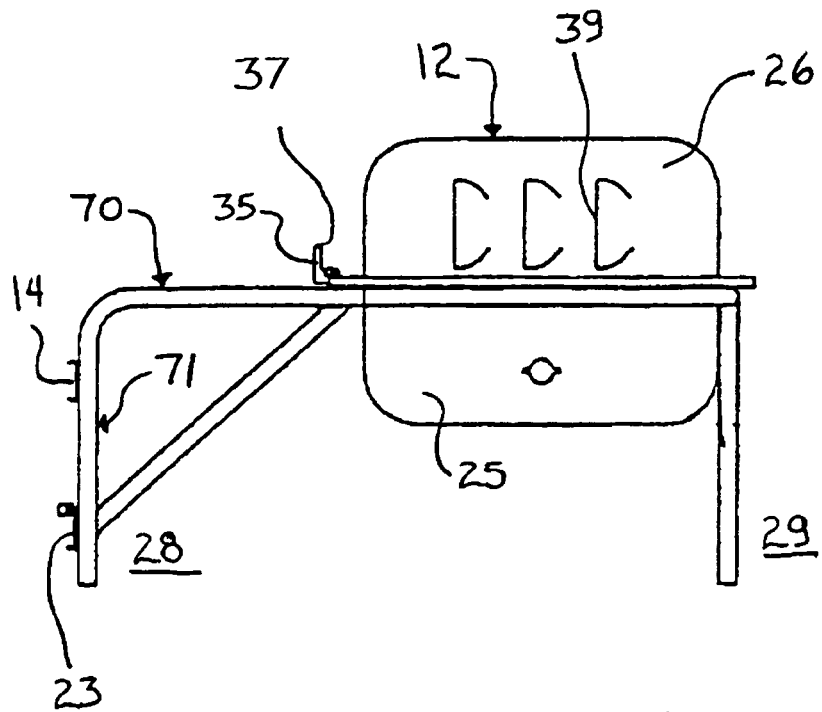
FIG. 15 is a side elevational view of another alternative preferred embodiment of the portable grill and support stand assembly.
Figure 16:
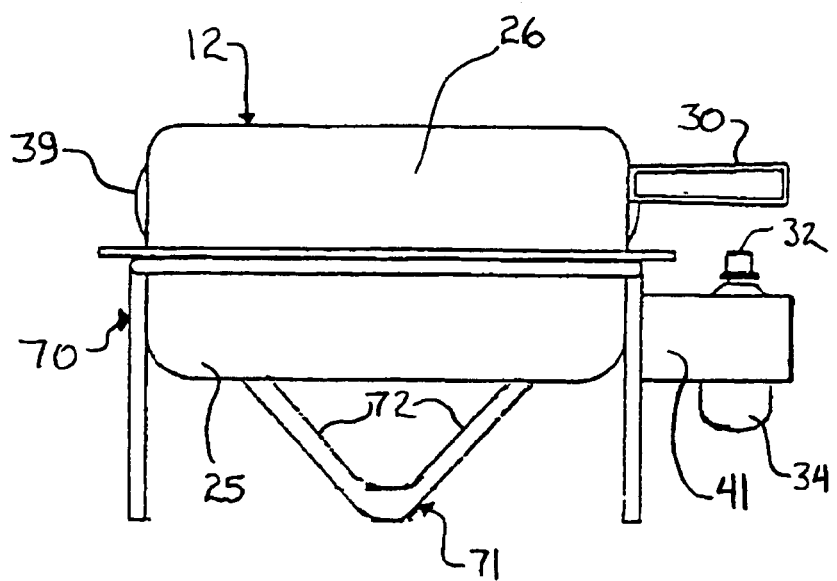
FIG. 16 is a front elevational view of the portable grill and support stand assembly of the embodiment of FIG. 15.

The alternative embodiment of FIGS. 15 and 16 disclose a support stand 70 with a single rear V-shaped support element 71 consisting of two downward angling members 72 that are fixedly secured to one another. Alternatively, V-shaped support element 71 may be coupled at the forward region of support stand 70 and single post legs coupled at the rearward region of support stand 70.

As can be seen in FIGS. 17-20, the support stand 11 is alternatively adapted to hold generally rectangular cutting board 13 when grill body 12 is removed. Cutting board 13 includes a set of mounting channels 86 formed to mate with forward and rear horizontal cross members 18 and 19, and is thus securely held within receptacle area 17. Although shown in use with support stand 11, cutting board 13 may be used with any of the alternative support stands 50, 55, 60, 65, or 70. Alternative or additional side support members 20 may be used that mate with alternative or additional channels on the undersurface of cutting board 13. Cutting board 13 is depicted as rectangular with rounded corners, but alternatively may be square, round, oval, hexagonal, or any desired shape of cutting surface with channels on the undersurface to mate with stand 11.

The support stands 11, 50, 55, 60, 65, and 70 of the above embodiments may be mounted to any generally vertical wall that is affixed with a suitable bracket element. This includes mounting to a suitable vehicle, such as cars vans, trucks, recreational vehicles, boats, trailers and the like. A wall mounted bracket element 80 is disclosed in FIGS. 22 and 23 that mates with mounting element 14 of FIG. 21. Wall mounted bracket element 80 includes ball nosed end 81 that is adapted to receive the hook end 82 of mounting element 14. Mounting element 14 then remains affixed to wall mounted bracket element 80 by the torque moment applied via any of the support stands 11, 50, 55, 60, 65, and 70 disclosed in the above embodiments.

The forward support elements 16 are preferably rigidly connected to side support members 20. Alternatively, the upper ends of forward support elements 16 may be pivotally coupled to side support members 20 in order to allow pivoting up into a storage position. In the lowered position forward support elements 16 are in an over-centered condition so the weight of the grill body 12 will force support elements 16 into a locked condition when resting on a horizontal surface. Pivoting support elements 16 may be coupled to pivot up against forward horizontal cross-member 52, or alternatively may pivot up against side support members 20. Alternatively, grill body 12 may include only lower section 25 and thus be an open grill without a lid 26.

Figure 24:
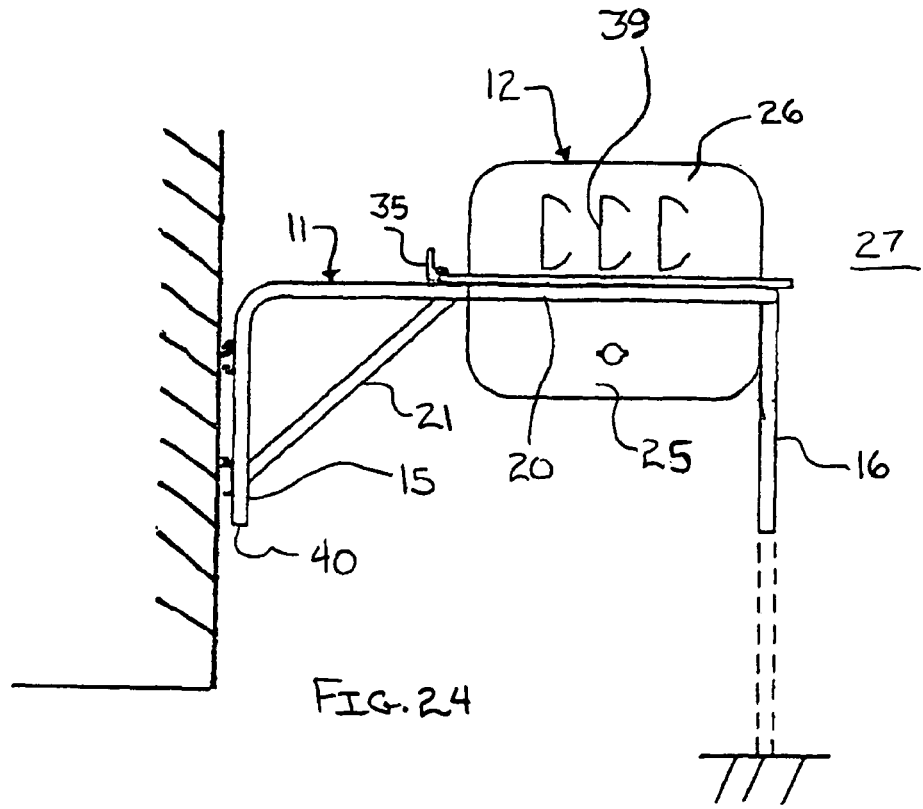
FIG. 24 is a side elevational view of the portable grill and support stand assembly of FIG. 1 shown mounted on a vertical wall of a vehicle.
Figure 25:
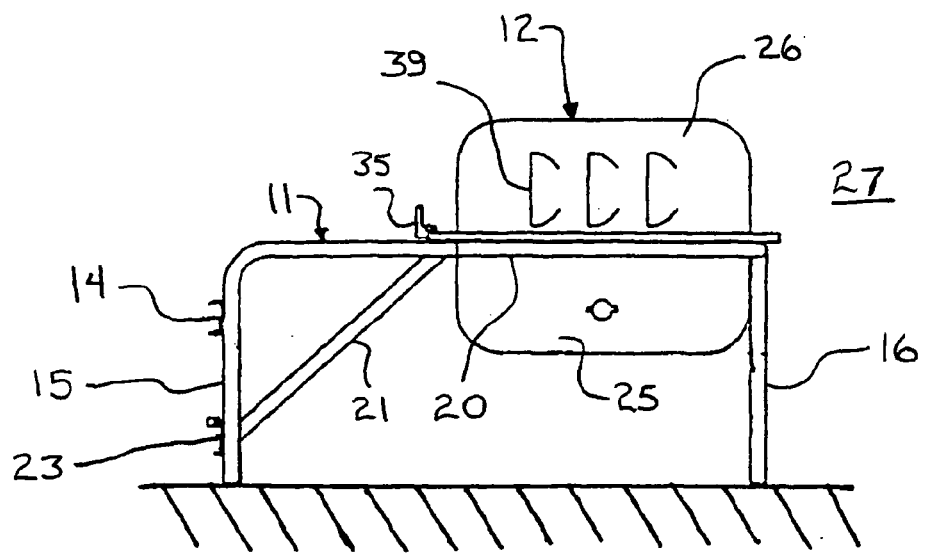
FIG. 25 is a side elevational view of the portable grill and support stand assembly of FIG. 1 shown supported on a horizontal surface or table.
Figure 26:
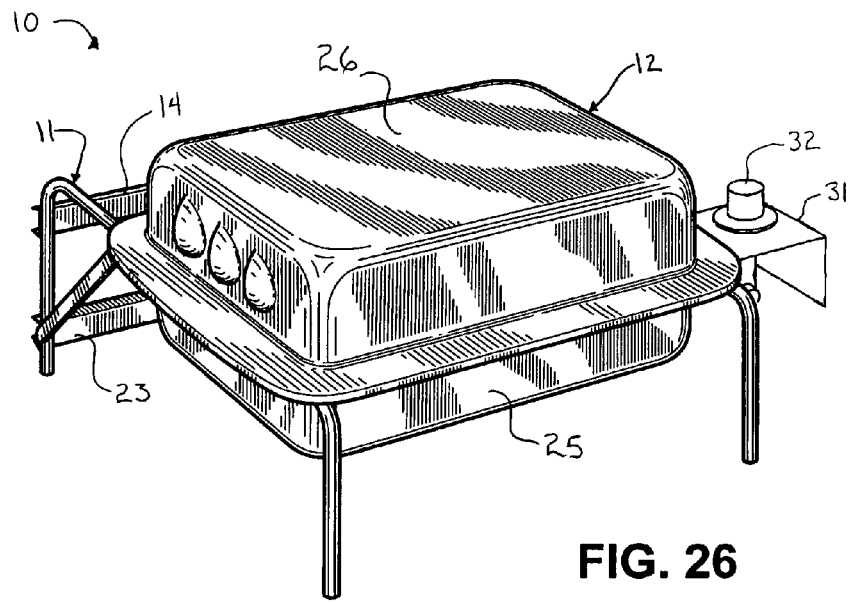
FIG. 26 is a perspective view of a preferred embodiment of the portable grill and support stand assembly.

Preferably support rack 11 holds grill body 12 and cutting board 13 in a cantilevered fashion when mounted on a generally vertical wall surface. Alternatively, forward support elements 16 may be telescoping legs (FIG. 24). With alternative telescoping forward support elements, forward support elements 16 may be selectively extended and lowered and provide direct vertical support to the forward region of grill body 12. With forward support elements telescoped into a shortened mode, support rack 11 may support grill body 12 and cutting board 13 on a horizontal surface.

An alternative preferred embodiment for a portable barbeque grill assembly is disclosed in FIGS. 40-46 and identified by reference numeral 100. The portable barbeque grill assembly 100 of this embodiment includes two offset regions 102, 104 on the support stand receptacle 106 and two generally laterally protruding side elements or handles extending from the sides of grill body 108, most preferably one of the side elements or handles is a gas valve support arm 110 and the other side element or handle is a beverage support arm 112. Notably, when grill body 108 is placed within receptacle 106 of support stand 114, arms 110, 112 are received within offset regions 102, 104.

Figure 43:
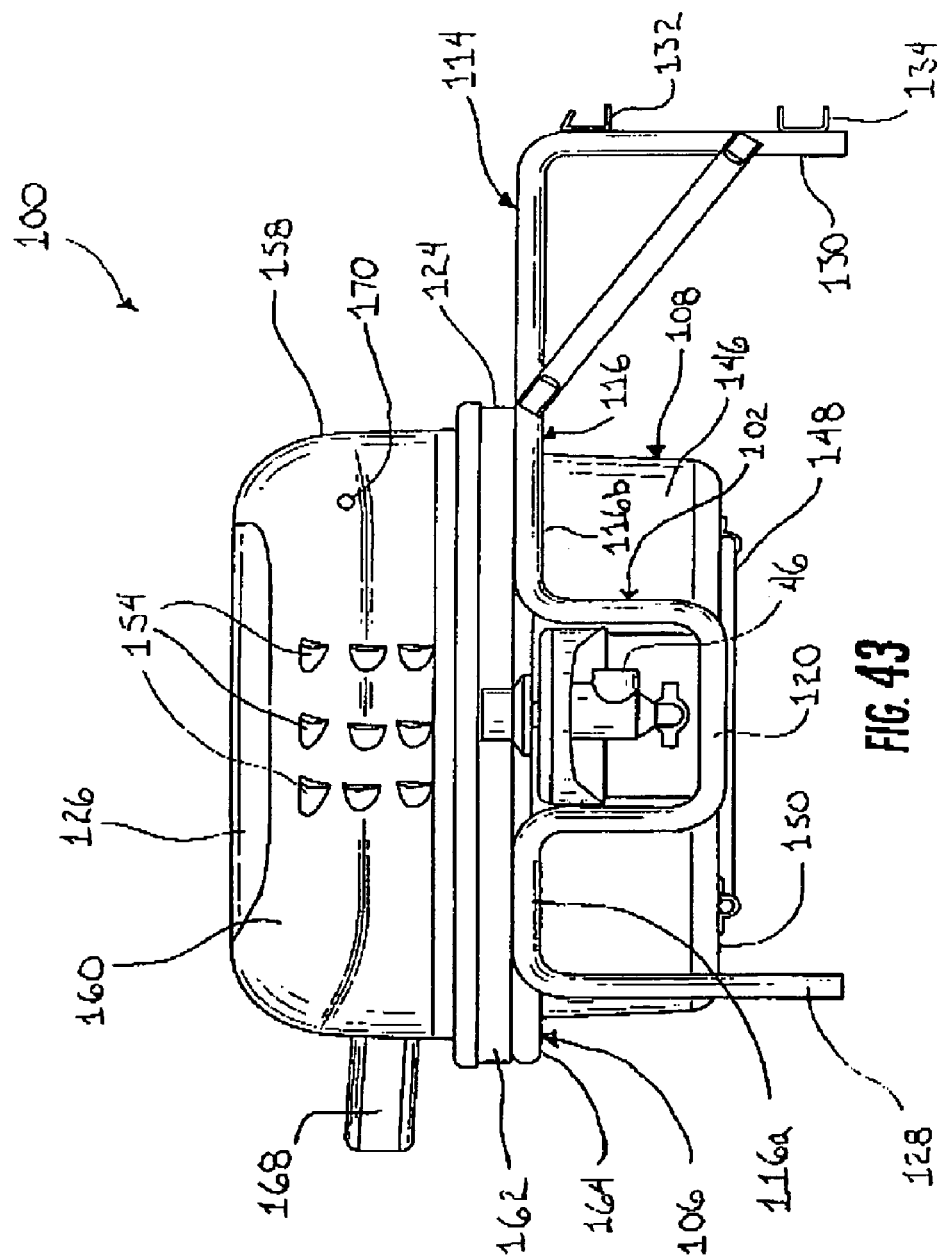
FIG. 43 is a right side elevational view of the portable barbeque grill assembly of FIG. 40.
Figure 44:
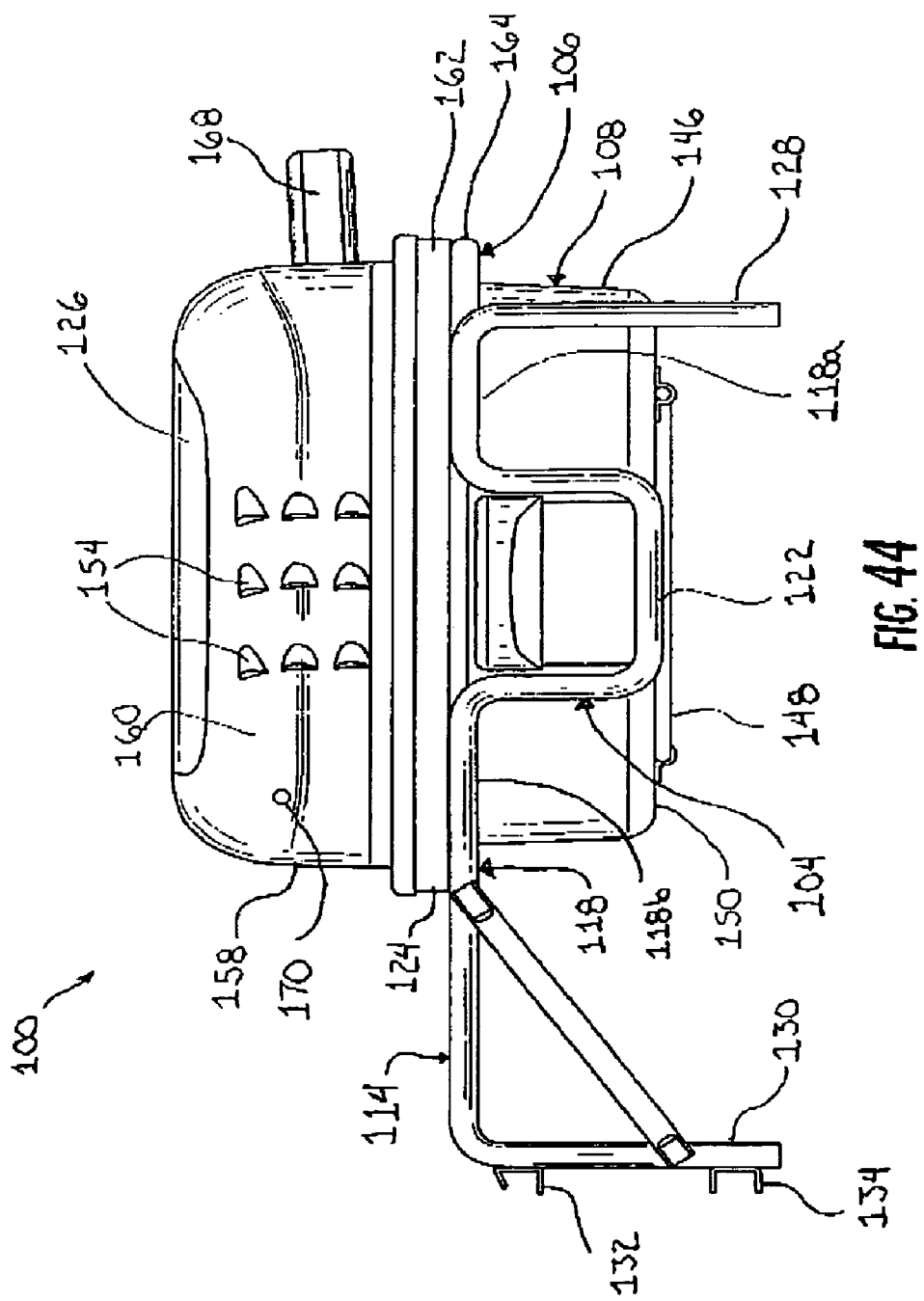
FIG. 44 is a left side elevational view of the portable barbeque grill assembly of FIG. 40.

As shown in FIGS. 43 and 44, offset regions 102, 104 are formed in side support members 116, 118 of receptacle 106. Each side support member 116, 118 includes a front portion 116a, 118a separated from a rear portion 116b, 118b by a distance approximately equal to the length of connecting members 120, 122 of offset regions 102, 104, where the connecting members 120, 122 are sized to be slightly wider than gas valve support arm 110 and beverage support arm 112. Offset regions 102, 104 thus function to create openings within side support members 116, 188 such that when grill body 108 is placed within receptacle 106, side support members 116, 118 support peripheral flange 124 of grill body 108 while arms 110, 112 are received within offset regions 102, 104.

The ability of arms 110, 112 to be received within offset regions 102, 104 is significant in regard to the assembly of grill body 108 to support stand 114. If support stand 114 did not include offset regions 102, 104, it would be necessary to tilt grill body 108 while lowering it into receptacle 106 in order to position arms 110, 112 under side supports 116, 118 as arms 110, 112 are lower than peripheral flange 124. Therefore, the inclusion of offset regions 102, 104 enables a grill operator to grasp arms 110, 112 and lower peripheral flange 124 into contact with receptacle 106 without having to tilt grill body 108. This provides for the easy and straight forward mounting of grill body 108 onto support stand 114. This is also beneficial in that it avoids the shifting of any food located on the internal grill surface within grill body 108 or the shifting of any charcoal briquettes or lava rocks located within grill body 108. Furthermore, the upper section or grill body lid 126 will not inadvertently open nor will a beverage stored on beverage support arm 112 be spilled.

Figure 40:
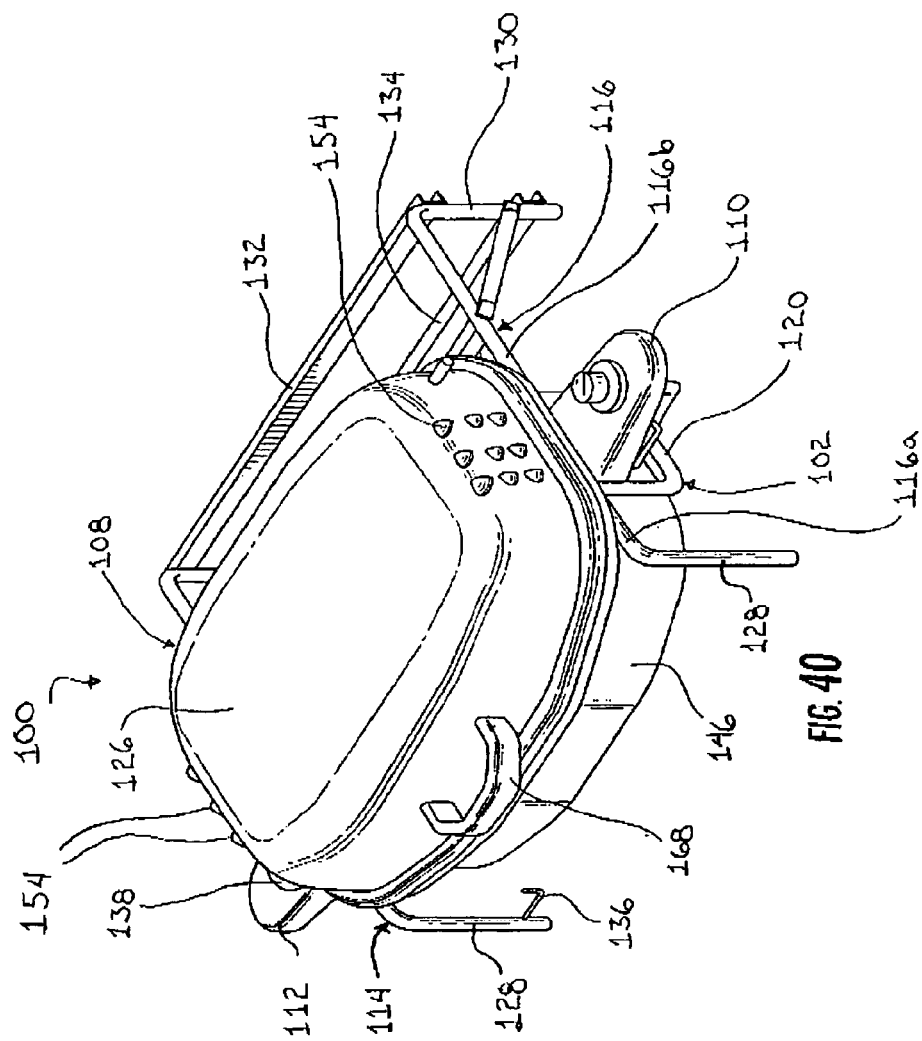
FIG. 40 is a perspective view of another preferred embodiment of the portable grill and support stand assembly.
Figure 42:
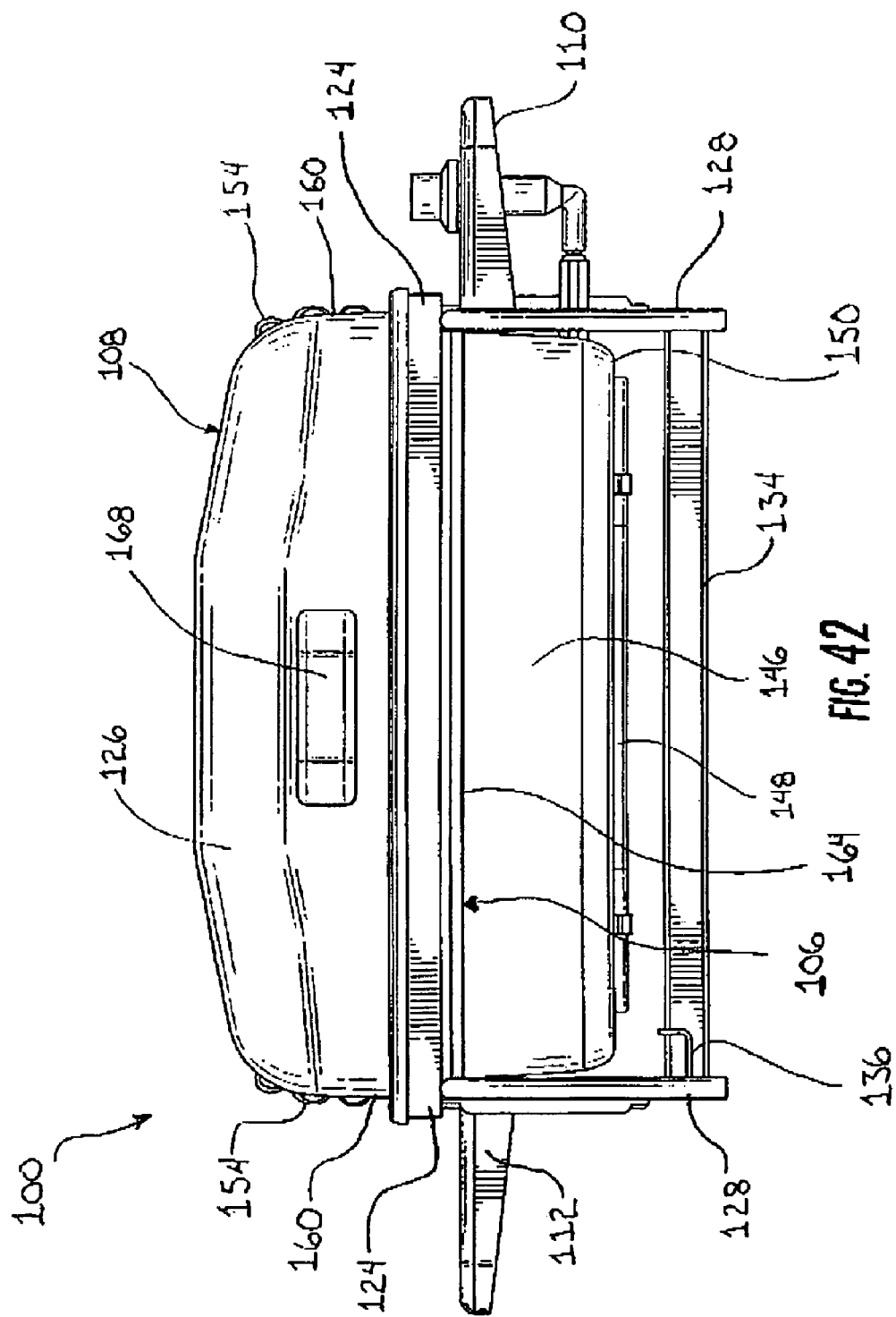
FIG. 42 is a front elevational view of the portable barbeque grill assembly of FIG. 40.

As shown in the various views, support stand 114 of portable grill assembly 100 includes forward and rear support elements 128, 130. Support stand 114 also includes mounting element 132 and lower brace 134 that are attached to and extend the entire length between rear support elements 130, without the use of upper and lower brace bars 22, 24 as in FIGS. 1 and 2. FIGS. 40 and 42 disclose that support stand 114 also includes a hook 136 mounted to a forward support element 128, where hook 136 is adapted to provide a convenient location to hang towels or grilling utensils, such as knives, tongs, and forks.

Figure 41:
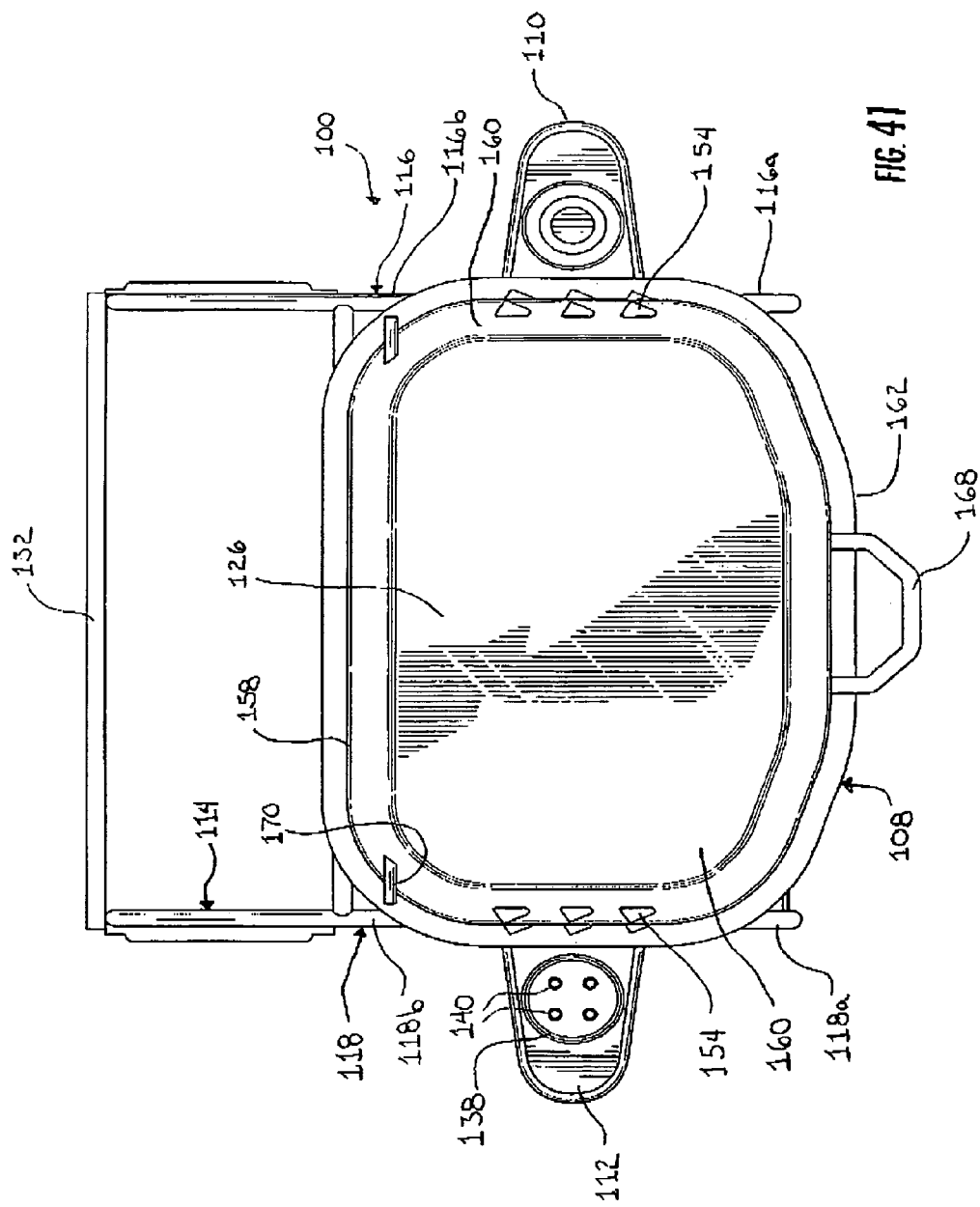
FIG. 41 is a top plan view of the portable barbeque grill assembly of FIG. 40.
Figure 46:
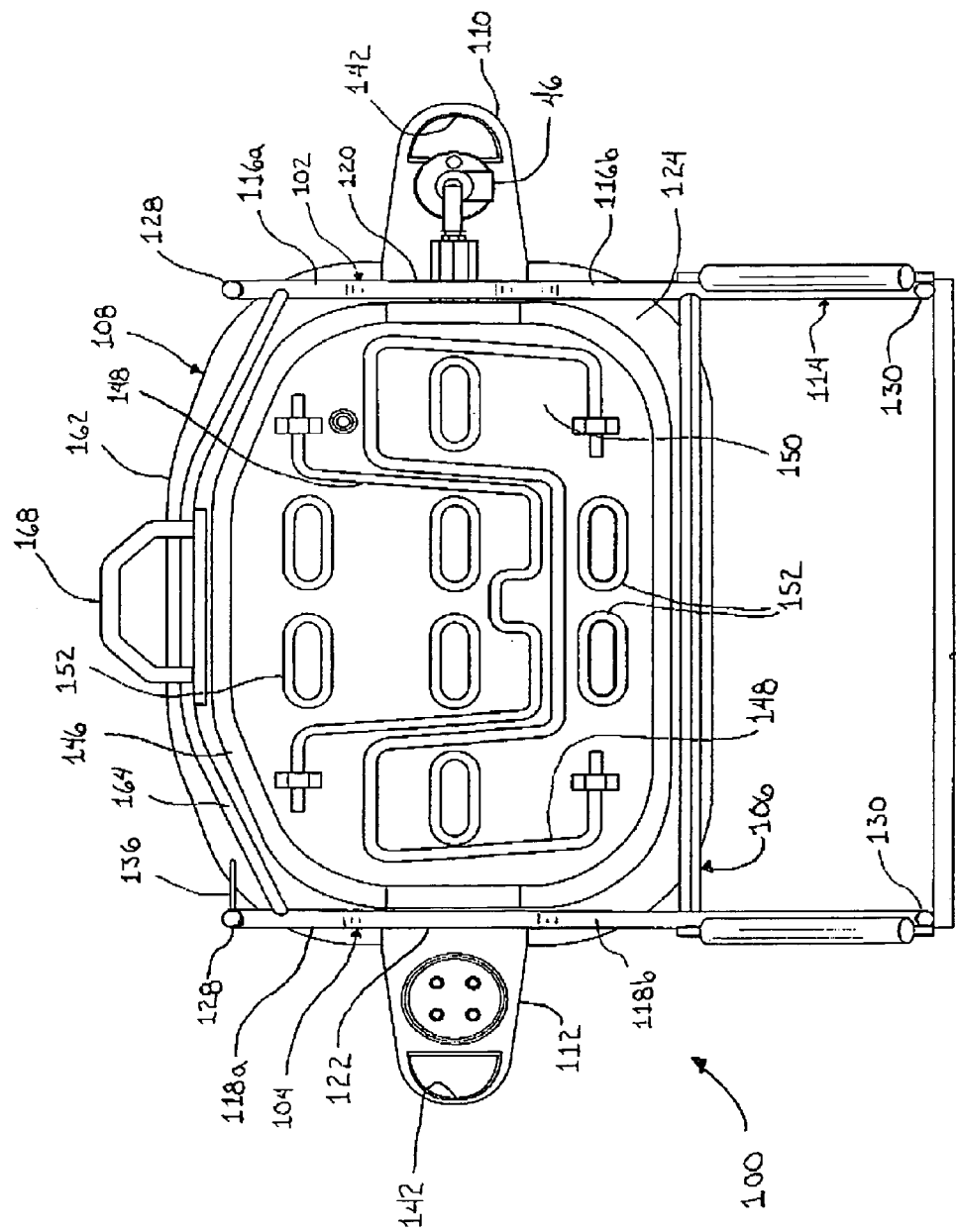
FIG. 46 is a bottom plan view of the portable barbeque grill assembly of FIG. 40.

As noted, grill body 108 includes beverage support arm 112 that, as shown in FIGS. 40 and 41, includes beverage detent 138. Beverage detent 138 is adapted to support a beverage container, such as a standard 12 oz. can, includes drain holes 140 to allow condensation or spillage to drain. In should be understood that beverage support arm 112 and beverage detent 138 may also be used to support cooking ingredients, such as seasoning salts and barbeque sauce, or may be alternatively configured and still function as a side element within the scope of the present invention. Alternatively detent or apertures of other shapes and depths may be incorporated into arm 112 in order to accommodate the support of differently shaped containers and implements. As shown in FIG. 46, beverage support arm 112 and gas valve support arm 110 include handle detents 142 that provide a more convenient location for a grill operator to grasp and lift grill body 108.

Grill body 108 comprises both an upper section 126 and a lower section 146 and, as shown in FIG. 46, includes pivoting legs 148 attached to the bottom 150 of lower section 146. Pivoting legs 148 enable grill body 108 to be used independently of support stand 114 by supporting grill body 108 on a generally horizontal surface without bottom 150 of lower section 146 contacting the surface.

Figure 45:
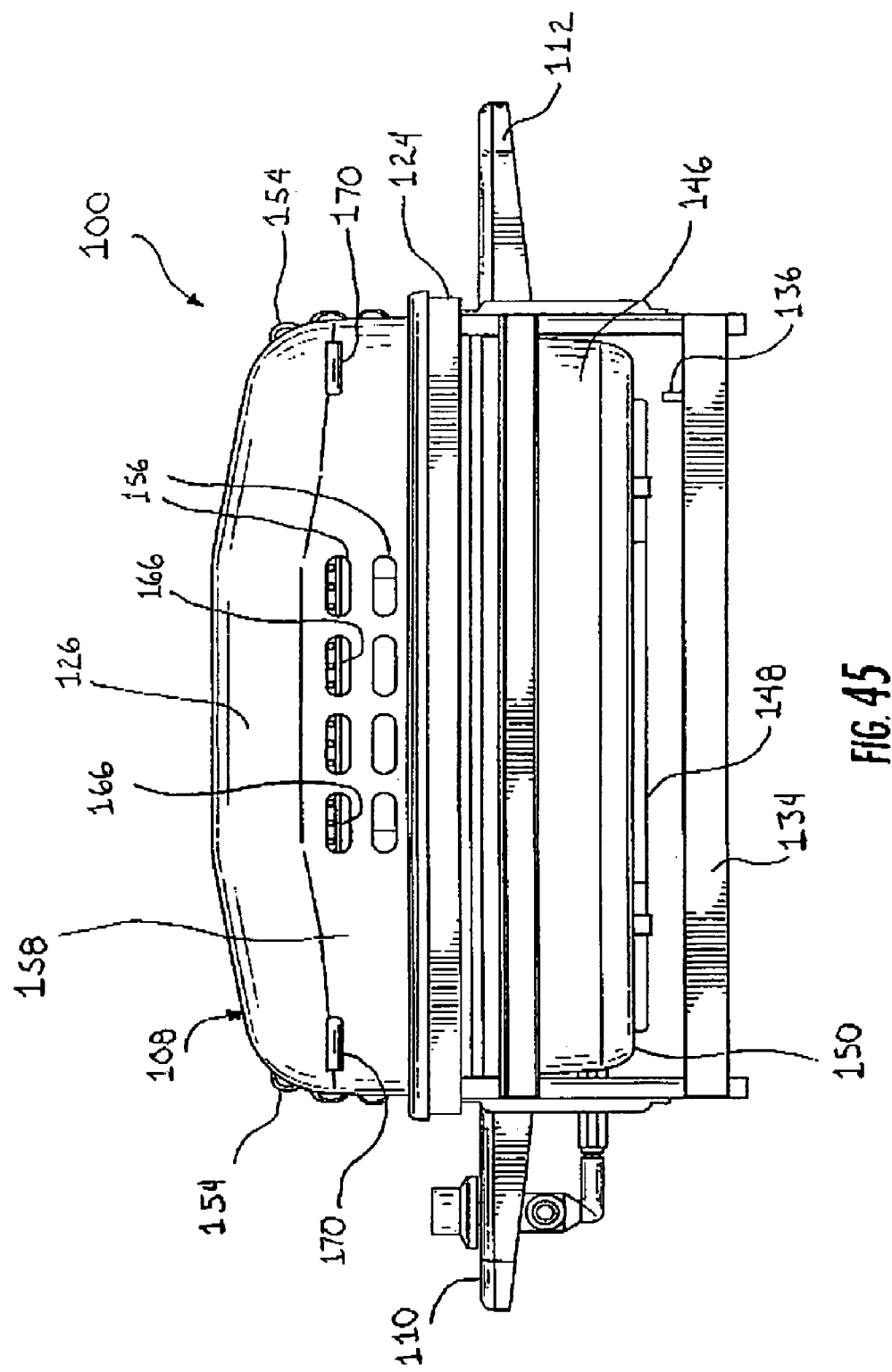
FIG. 45 is a rear elevational view of the portable barbeque grill assembly of FIG. 40.

As shown in the various views, grill body 108 of portable grill assembly 100 includes both air inlets 152 (FIG. 46) and air outlets, where the air outlets are disclosed as vents 154 and apertures 156 (FIG. 45). Circulation through grill body 108 occurs due to the exiting of heated exhaust fumes out of vents 154 and apertures 156, which draws unheated air into grill body 108 through air inlets 152. Apertures 156 are located on the rear 158 of upper section 144 and vents 154 are located on the sides 160 and are constructed as embossed outlet louvers that direct the heated exhaust fumes away from a grill operator. Although the air outlets on the sides 160 of upper section 144 are disclosed as vents 154, it should be understood that these air outlets could alternatively be side apertures similar to apertures 156. Furthermore, the locations of apertures 156 and vents 154 could be altered while still providing the appropriate circulation through grill body 108.

Portable barbeque grill assembly 100 also discloses the use of an alternatively shaped grill body 108 and receptacle 106 as compared to the grill body 12 and receptacle 17 of FIGS. 1 and 2. As shown in FIGS. 40-42, the front side 162 of grill body 108 and peripheral flange 124 are non-linear and, correspondingly, the forward horizontal cross member 164 of receptacle 106 is non-linear.

Grill assembly 100 also discloses the inclusion of a secondary grill surface 166 within upper section 144. As best understood from FIG. 45, secondary grill surface 166 is pivotably mounted to upper section 144 in a conventional manner such that upwards rotation of upper section 144 by use of U-shaped handle 168 causes secondary grill surface 166 to simultaneously move slightly upwards and rearwards with respect to a main grill surface mounted to lower section 146. As disclosed, a rear rod 170 of secondary grill surface 166 extends parallel to and out of the rear 158 of upper section 144 to form a pivoting connection of secondary grill surface 166 to upper section 144.

The above is a description of the preferred embodiments. One skilled in the art will recognize that changes and modifications may be made without departing from the spirit of the disclosed invention, the scope of which is to be determined by the claims which follow and the breadth of interpretation that the law allows.

The embodiments of the invention in which an exclusive property right or privilege is claimed are defined as follows:

1. A portable barbeque grill assembly, said grill assembly comprising:

a grill body, said grill body having two generally laterally protruding side elements; and a support stand, said support stand including a grill body receptacle and at least one support element, whereby said receptacle is adapted to removably hold said grill body, said receptacle including an opening defining a generally horizontal plane and at least partially surrounding said grill body when said grill body is held by said receptacle;

said receptacle including two offset regions, said two offset regions being disposed beneath the plane defined by said opening and adapted to receive said two generally laterally protruding side elements when said grill body is held by said receptacle, wherein said receptacle includes a pair of side support members, each said side support member including a said offset region, and wherein said grill body includes a peripheral flange adapted to support said grill body on said side support members when said grill body is received by said receptacle, wherein said protruding side elements are received by said offset regions when said grill body is received by said receptacle.

2. The portable barbeque grill assembly of claim 1, wherein said side elements are handles, said handles being adapted to enable an operator to carry said grill body.

3. The portable barbeque grill assembly of claim 1, wherein one of said side elements is a gas valve support arm and the other of said side elements is a beverage support arm.

4. The portable barbeque grill assembly of claim 1, wherein said grill body includes legs adapted to support said grill body on a substantially horizontal surface independently from said support stand.

5. The portable barbeque grill assembly of claim 4, wherein said legs are pivotably attached to said grill body.

6. The portable barbeque grill assembly of claim 1, further including a hook on said support stand, said hook being adapted to hold cooking and cleaning equipment.

7. The portable barbeque grill assembly of claim 1, wherein said grill body comprises an upper section and a lower section, said lower section including a food supporting grill therein.

8. The portable barbeque grill assembly of claim 7, wherein said lower section includes at least one air inlet and said upper section includes a plurality of air outlets.

9. The portable barbeque grill assembly of claim 8, wherein said plurality of air outlets are vents formed as embossed louvers adapted to direct exhaust air away from a grill assembly user.

10. The portable barbeque grill assembly of claim 8, wherein said plurality of air outlets are apertures.

11. The portable barbeque grill assembly of claim 8, wherein said plurality of air outlets comprise a plurality of vents and a plurality of apertures.

12. The portable barbeque grill assembly of claim 7, wherein said upper section and said lower section are coupled by a hinge, and wherein a food supporting grill is pivotally attached to said upper section.

13. The portable barbeque grill assembly of claim 1, wherein one of said side elements includes a beverage container support.

14. A portable barbeque grill assembly adapted for selective independent and alternating use on a substantially vertical surface and a substantially horizontal surface, said grill assembly comprising:

a grill body, said grill body having two generally laterally protruding side elements; and a support stand, said support stand including a receptacle, a mounting element, and a plurality of support elements, whereby said mounting element enables said support stand to be detachably mounted to a generally vertical surface, said plurality of support elements enables said support stand to be alternatively and independently supported on a generally horizontal surface, and said receptacle is adapted to removably hold said grill body such that said grill body is supported on either a substantially vertical surface or a substantially horizontal surface;

said receptacle including two offset regions adapted to receive said two generally laterally protruding side elements when said grill body is held by said receptacle, wherein said receptacle includes a pair of side support members, each said side support member including a said offset region, and wherein said grill body includes a peripheral flange adapted to support said grill body on said side support members when said grill body is received by said receptacle, wherein said protruding side elements are received by said offset regions when said grill body is received by said receptacle.

15. The portable barbeque grill assembly of claim 14, wherein one of said side element is a gas valve support arm and the other of said side elements is a beverage support arm.

16. The portable barbeque grill assembly of claim 14, wherein one of said side elements include a beverage container support.

* * * * *